US008545365B2

(12) United States Patent
Miyazaki et al.

(10) Patent No.: US 8,545,365 B2
(45) Date of Patent: *Oct. 1, 2013

(54) VEHICULAR POWER TRANSMISSION CONTROL APPARATUS

(75) Inventors: Takeshige Miyazaki, Chiryu (JP); Hiroki Hatori, Nishio (JP); Kan Sasaki, Nagoya (JP); Toshio Tanba, Kariya (JP); Yousuke Hayashi, Toyota (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 703 days.

This patent is subject to a terminal disclaimer.

(21) Appl. No.: 12/720,979

(22) Filed: Mar. 10, 2010

(65) Prior Publication Data

US 2010/0234169 A1    Sep. 16, 2010

(30) Foreign Application Priority Data

Mar. 11, 2009   (JP) .................................. 2009-57468

(51) Int. Cl.
*F16H 37/06* (2006.01)
*B60K 6/48* (2007.10)
*B60K 6/387* (2007.10)

(52) U.S. Cl.
USPC .................. 477/3; 477/5; 477/97; 180/65.21

(58) Field of Classification Search
USPC .............................................. 477/3, 5, 98, 97
See application file for complete search history.

(56) References Cited

U.S. PATENT DOCUMENTS 6,835,160 B2 * 12/2004 Kitano et al. ...................... 477/5
8,210,985 B2 * 7/2012 Tanba et al. ........................ 477/3

2002/0060114 A1   5/2002 Maruyama
2002/0115516 A1*  8/2002 Kawabata et al. ............... 475/5
2003/0064858 A1   4/2003 Saeki et al.
2004/0192494 A1   9/2004 Ozeki et al.
2009/0036263 A1*  2/2009 Iwase et al. ....................... 477/3

FOREIGN PATENT DOCUMENTS

JP  2000-224710 A1  8/2000
JP  2002-155965 A1  5/2002
JP  2003-156079 A1  5/2003
JP  2004-204957 A1  7/2004
WO  WO 2009098919 A1 * 8/2009

OTHER PUBLICATIONS

U.S. Appl. No. 12/720,940, filed Mar. 10, 2010, Tanba et al.
U.S. Appl. No. 12/720,956, filed Mar. 10, 2010, Miyazaki et al.
U.S. Appl. No. 12/720,964, filed Mar. 10, 2010, Miyazaki et al.
U.S. Appl. No. 12/720,984, filed Mar. 10, 2010, Miyazaki et al.
U.S. Appl. No. 12/754,931, filed Apr. 6, 2010, Tanba et al.
U.S. Appl. No. 12/754,964, filed Apr. 6, 2010, Hatori et al.

* cited by examiner

*Primary Examiner* — David D Le
*Assistant Examiner* — Lillian Nguyen
(74) *Attorney, Agent, or Firm* — Burr & Brown

(57) ABSTRACT

An apparatus comprises a changeover mechanism which is able to change a connection state of an electric motor output shaft to any one from alternatives consisting of "an IN-Connection State" in which a power transmission path is provided between a transmission input shaft and the electric motor output shaft, "an OUT-Connection State" in which a power transmission path is provided between the transmission output shaft and the electric motor output shaft, and "a neutral connection state" in which no transmission path therebetween is provided. The changeover is carried out based on a combination (area) of a vehicle speed V and a required driving torque T. As for the changeover, an (first, second) IN-connection area is more enlarged and the OUT-Connection area and the neutral connection area are more narrowed, as a temperature of a lubricating oil is lower.

9 Claims, 11 Drawing Sheets

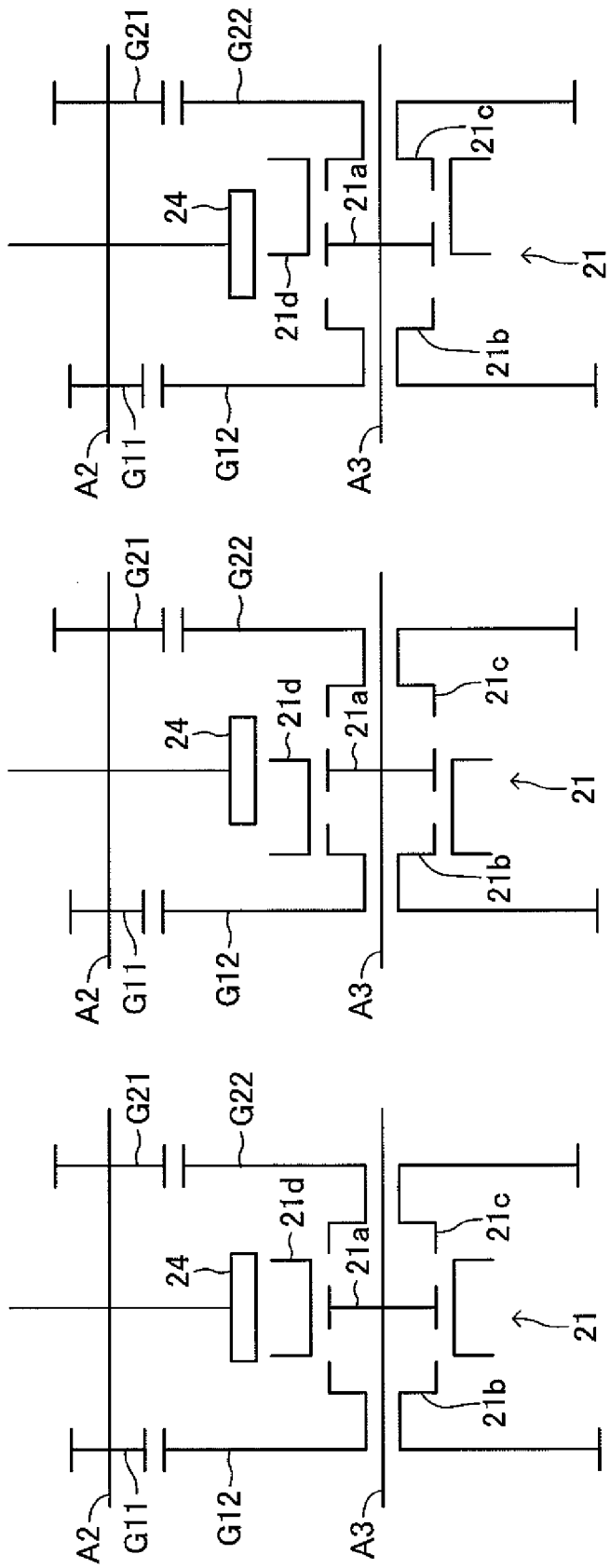

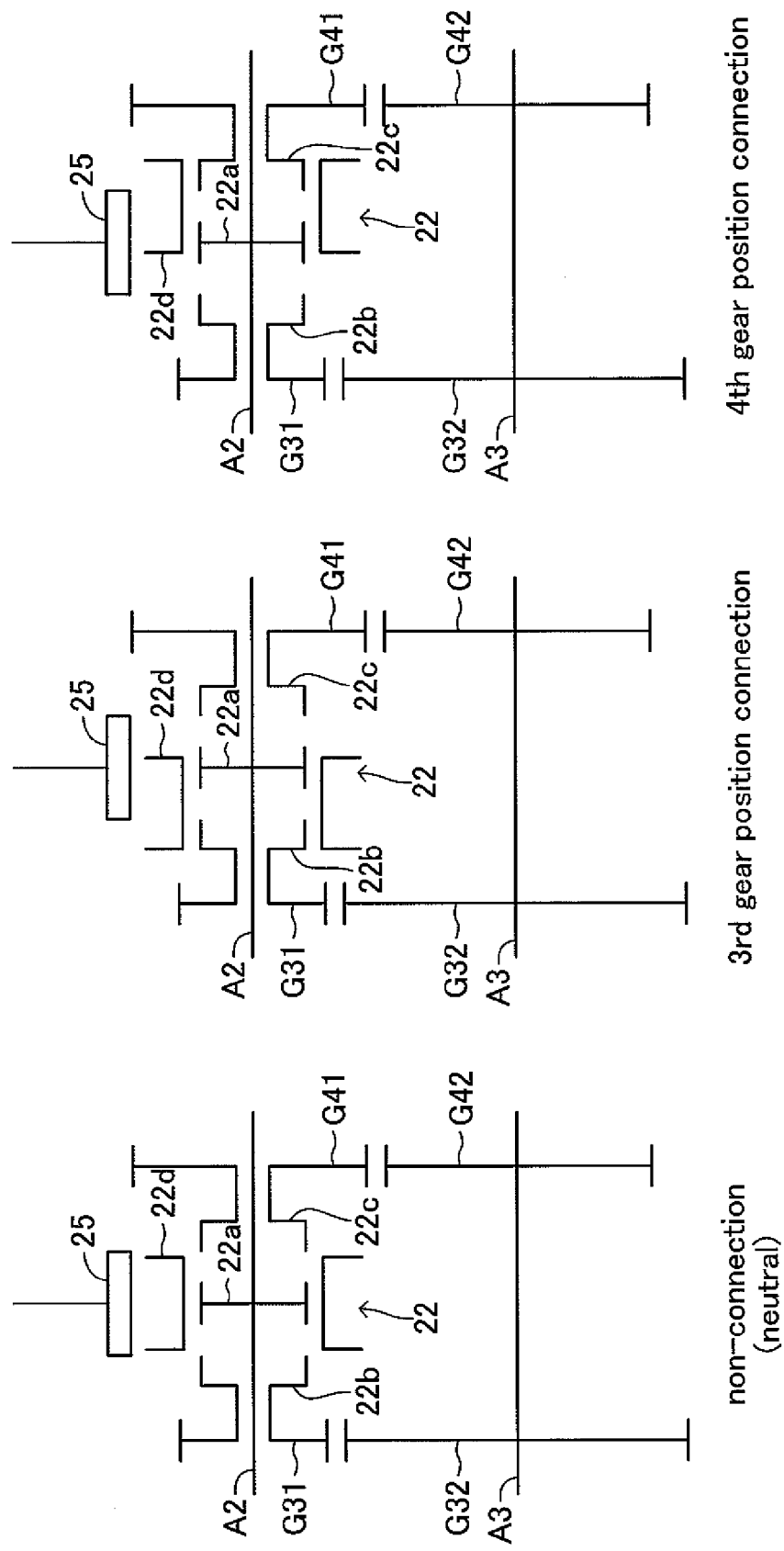

non-connection
(neutral)

5th gear position connection

FIG.6A In-connection  FIG.6B Out-connection  FIG.6C non-connection (neutral)

VEHICULAR POWER TRANSMISSION CONTROL APPARATUS

BACKGROUND OF THE INVENTION

1. Field of the Invention

The present invention relates to a vehicular power transmission control apparatus, especially to a vehicular power transmission control apparatus applied to a vehicle comprising an internal combustion engine and an electric motor as power sources.

2. Description of the Related Art

In these days, a so-called hybrid vehicle comprising an internal combustion engine and an electric motor (electric motor generator) as power sources has been developed (refer to, for example, Japanese Unexamined Patent Application Publication No. 2000-224710). In the hybrid vehicle, the electric motor is used as the power source generating a driving torque for driving the vehicle together with the internal combustion engine or by itself, or is used as a power source for starting the internal combustion engine.

Further, the electric motor is used as an electric motor generator for generating a regeneration torque to provide a breaking force to the vehicle, or is used as an electric motor generator for generating an electric power which is supplied to and stored in a battery of the vehicle. These usages of the electric motor can improve a total energy efficiency (fuel consumption) of the vehicle as a whole.

SUMMARY OF THE INVENTION

In the meanwhile, in the hybrid vehicle, there is a case where a connection state (hereinafter, referred to as an "IN-Connection State") is used in which a power transmission path between an output shaft of the electric motor and an input shaft of a transmission is provided, and there is another case where another connection state (hereinafter, referred to as an "OUT-Connection State") is used in which a power transmission path between the output shaft of the electric motor and an output shaft of the transmission (and thus, driving wheels) is provided without involving the transmission.

In the "IN-Connection State", a rotational speed of the output shaft of the electric motor with respect to a vehicle speed can be varied by changing a gear position of the transmission. Accordingly, adjusting the gear position of the transmission can provide an advantage such that the rotational speed of the output shaft of the electric motor can easily be maintained within a range in which an energy conversion efficiency (more specifically, an efficiency in generating the driving torque, the regeneration torque, or the like) is high.

On the other hand, the "OUT-Connection State" provides an advantage such that a power transfer loss can be made smaller, since the power transmission path does not involve the transmission having a complicated mechanism. In addition, in the transmission (especially, in a transmission of a type which does not include a torque converter), a power transmission from the input shaft of the transmission to the output shaft of the transmission is generally shut off temporarily during a gear position shifting operation (during an operation in which the gear position is changed). Consequently, a rapid change in an acceleration in a front-rear direction of the vehicle (so-called shift shock) tends to occur. However, the "OUT-Connection State" allows the driving torque from the electric motor to be continuously transmitted to the output shaft of the transmission (and therefore to the drive wheels) even during the gear position shifting operation, and therefore provides an advantage such that the shift shock is suppressed.

In view of the above, the assignee of the present invention has already proposed a changeover mechanism which can change/switch a connection state of the output shaft of the electric motor between the IN-Connection State and the OUT-Connection State, in Japanese Patent Application No. 2007-271556. The changeover mechanism can further change the connection state of the output shaft of the electric motor to a state in which neither a power transmission path between the output shaft of the electric motor and the input shaft of the transmission nor a power transmission path between the output shaft of the electric motor and the output shaft of the transmission is provided. Hereinafter, this state is referred to as a "non-connection state".

In the meanwhile, when a temperature of a lubricating oil in the transmission is low, a viscosity of the lubricating oil is high. Accordingly, a rotational resistance of each of various rotating shafts in the transmission becomes large. As a result, there may arise a problem of increasing power loss within the transmission, and an energy efficiency (fuel consumption) may therefore decrease. In view of the above, it is desirable to increase/raise the temperature of the lubricating oil in the transmission as early as possible, when the temperature of the lubricating oil is low.

An output of the electric motor is not transmitted to the transmission under the OUT-Connection State and the non-connection state, whereas the output of the electric motor is transmitted to the transmission under the IN-Connection State. Accordingly, it is expected that, under the IN-Connection State, the temperature of the lubricating oil in the transmission will easily be increased by an amount depending on the power transmitted to the transmission from the electric motor, compared to under the OUT-Connection State and the non-connection state. In view of the above, it is considered to be preferable to lengthen a time period in which the IN-Connection State is selected (or to increase a frequency of selecting the IN-Connection State), when the temperature of the lubricating oil is low.

An object of the present invention is therefore to provide a vehicular power transmission control apparatus applied to a vehicle comprising an internal combustion engine and an electric motor as power sources, the control apparatus being able to appropriately select a connection state of an output shaft of the electric motor to thereby effectively increase the temperature of the lubricating oil in a transmission.

The vehicular power transmission control apparatus according to the present invention comprises a transmission, a changeover mechanism, transmission oil temperature obtaining means, and control means. Each of them will be described hereinafter.

The transmission comprises: an input shaft to provide/realize a power transmission path between the input shaft of the transmission and an output shaft of the internal combustion engine; and an output shaft to provide/realize a power transmission path between the output shaft of the transmission and drive wheels of the vehicle. The transmission is configured so as to be able to adjust a ratio (transmission reduction ratio) of a rotational speed of the input shaft of the transmission to a rotational speed of the output shaft of the transmission. It should be noted that the transmission may be a multiple gear ratio transmission which can realize each of a plurality of predetermined reduction ratios different from one another as the transmission reduction ratio, or may be a continuously variable transmission which can continuously (in a non-stepwise fashion) adjust a reduction ratio as the transmission reduction ratio (in non-stepwise fashion).

Further, the transmission may be "a multiple gear ratio transmission or a continuously variable transmission (so-called automatic transmission (AT))" comprising a torque converter and being configured in such a manner that the gear position shifting operation is automatically performed in accordance with a vehicle driving condition, or may be "a multiple gear ratio transmission without the torque converter (so-called manual transmission (MT))". If the transmission is the manual transmission, the transmission may be, but not limited to, any one of the following types.

A type in which the gear position shifting operation is performed directly by a force applied to a shift lever from a driver.

A type in which the gear position shifting operation is performed by a drive force generated by an actuator which is driven in response to a signal indicative of a position of the shift lever which the driver operates.

A type in which the gear position shifting operation can be automatically performed by a drive force generated by an actuator which is automatically driven in accordance with the vehicle driving condition, without depending on an operation of the shift lever by the driver (i.e., a so-called automated manual transmission).

The changeover mechanism can change a connection state of the output shaft of the electric motor to any one from alternatives comprising two or more of an IN-Connection State as an essential state, an OUT-Connection State, and a non-connection state, the IN-Connection State (input-side-connection state) being a state in which a power transmission path is provided between the output shaft of the electric motor and the input shaft of the transmission, the OUT-Connection State (output-side-connection state) being a state in which a power transmission path is provided between the output shaft of the electric motor and the drive wheels without involving the transmission, and the non-connection state being a state in which neither a power transmission path between the output shaft of the electric motor and the input shaft of the transmission, nor a power transmission path between the output shaft of the electric motor and the output shaft of the transmission (i.e., the drive wheels) is provided. That is, the changeover mechanism may be, but not limited to, one of the followings.

A changeover mechanism which can change the connection state of the output shaft of the electric motor into any one of the IN-Connection State and the OUT-Connection State, only (i.e. which can realize any one from the IN-Connection State and the OUT-Connection State, only).

A changeover mechanism which can change the connection state of the output shaft of the electric motor into any one of the IN-Connection State and the non-connection state, only (i.e. which can realize any one from the IN-Connection State and the non-connection state, only).

A changeover mechanism which can change the connection state of the output shaft of the electric motor into any one of the IN-Connection State, the OUT-Connection State, and the non-connection state (i.e. which can realize any one from the IN-Connection State, the OUT-connection state, and the non-connection state).

In the IN-Connection State, a ratio (hereinafter, referred to as a "first reduction ratio") of the rotational speed of the output shaft of the electric motor to the rotational speed of the input shaft of the transmission is generally fixed to a constant (e.g., 1). Hereinafter, a product of "the first reduction ratio" and "the transmission reduction ratio" is referred to as an "IN-connection reduction ratio". "The IN-connection reduction ratio" varies in accordance with a change in "the transmission reduction ratio" caused by the gear position shifting operation of the transmission. On the other hand, in the OUT-Connection State, a ratio of the rotational speed of the output shaft of the electric motor to a rotational speed of the output shaft of the transmission is generally fixed to a constant (e.g., a value larger than 1, a value close to the transmission reduction ratio corresponding to a 2nd gear position, or the like). Hereinafter, this ratio is referred to as an "OUT-connection reduction ratio". "The OUT-connection reduction ratio" is kept constant, even when "the transmission reduction ratio" varies. It should be noted that a ratio of the rotational speed of the output shaft of the internal combustion engine to a rotational speed of the input shaft of the transmission is generally set at a constant (e.g., 1).

The transmission oil temperature obtaining means obtains an oil-temperature-correlating-value correlating with a temperature of a lubricating oil in the transmission. Examples of the oil-temperature-correlating-value include the temperature of the lubricating oil in the transmission itself, a temperature of a cooling water to cool the internal combustion engine, a sum of a running distance of the vehicle after the start of the vehicle, a sum of a running time of the vehicle after the start of the vehicle, and an air temperature, etc.

The control means selects a (target) connection state of the output shaft of the electric motor (from the connection states which the changeover means can realize), based on the oil-temperature-correlating-value and a parameter indicative of a running condition of the vehicle other than the oil-temperature-correlating-value, in such a manner that a possibility of selecting the IN-Connection State becomes higher as the temperature of the lubricating oil is lower. In other words, an ease by which the IN-Connection State is selected is increased (made greater) as the temperature of the lubricating oil is lower. The control means further controls the changeover means in such a manner that an actual connection state of the output shaft of the electric motor coincides with the selected connection state (as the target connection state).

Examples of the parameter indicative of the running condition of the vehicle include a value correlating with the vehicle speed (speed of the vehicle), a value correlating with a required driving torque obtained based on an operation of an acceleration operating member by the driver of the vehicle, and so on. Examples of the value correlating with the vehicle speed include the vehicle speed itself, the rotational speed of the input shaft of the transmission, the rotational speed of the output shaft of the internal combustion engine, and the rotational speed of the output shaft of the electric motor, and so on. Examples of the value correlating with the required driving torque include an operating amount of the acceleration operating member and an opening degree of a throttle valve disposed in an intake passage of the internal combustion engine.

According to the configuration described above, the IN-Connection State is more easily selected as the temperature of the lubricating oil is lower. Accordingly, when the temperature of the lubricating oil is low, a time period in which the IN-Connection State is selected lengthens (that is, the IN-Connection State is selected more frequently). As a result, a time period in which the output from the electric motor is transmitted to the transmission lengthens, and the temperature of the lubricating oil can therefore be effectively increased.

More specifically, the control means is preferably configured so as to, in a case where it changes the actual connection state of the output shaft of the electric motor from the IN-Connection State to a connection state other than the IN-Connection State (i.e., the OUT-Connection State or the non-connection state) when the value correlating with a speed of the vehicle passes over a threshold while the value correlating with a speed of the vehicle is increasing, adjust the threshold in such a manner that the threshold becomes larger as the temperature of a lubricating oil is lower. According to the configuration described above, during the vehicle speed is increasing, a timing at which the changeover (shifting) from the IN-Connection State to the connection state other than the IN-Connection State is carried out is more delayed as the temperature of the lubricating oil is lower. That is, a time period in which the IN-Connection State is selected lengthens. Consequently, the temperature of the lubricating oil can be effectively increased.

Further, the control means is preferably configured so as to, in a case where it changes the actual connection state of the output shaft of the electric motor from the connection state other than the IN-Connection State (i.e., the OUT-Connection State or the non-connection state) to the IN-Connection State when the value correlating with a speed of the vehicle passes over another threshold while the value correlating with a speed of the vehicle is increasing, adjust the another threshold in such a manner that the another threshold becomes smaller as the temperature of a lubricating oil is lower. According to the configuration described above, during the vehicle speed is increasing, a timing at which the changeover (shifting) from the connection state other than the IN-Connection State to the IN-Connection State is carried out comes earlier as the temperature of the lubricating oil is lower. That is, a time period in which the IN-Connection State is selected lengthens. Consequently, the temperature of the lubricating oil can be effectively increased.

Similarly, the control means is preferably configured so as to, in a case where it changes the actual connection state of the output shaft of the electric motor from the IN-Connection State to the connection state other than the IN-Connection State (i.e., the OUT-Connection State or the non-connection state) when a value correlating with a required driving torque passes over still another threshold while the value correlating with a required driving torque is increasing, adjust the still another threshold in such a manner that the still another threshold becomes larger as the temperature of a lubricating oil is lower. According to the configuration described above, during the required driving torque is increasing, a timing at which the changeover (shifting) from the IN-Connection State to the connection state other than the IN-Connection State is carried out is more delayed as the temperature of the lubricating oil is lower. That is, a time period in which the IN-Connection State is selected lengthens. Consequently, the temperature of the lubricating oil can be effectively increased.

Further, the control means may preferably be configured so as to, change the actual connection state of the output shaft of the electric motor from the IN-Connection State (hereinafter, referred to as a "first IN-Connection State") to the OUT-Connection State, when the value correlating with a speed of the vehicle passes over a first threshold while the value correlating with a speed of the vehicle is increasing;

change the actual connection state of the output shaft of the electric motor from the OUT-Connection State to the IN-Connection State (hereinafter, referred to as a "second IN-Connection State"), when the value correlating with a speed of the vehicle passes over a second threshold larger than the first threshold while the value correlating with a speed of the vehicle is increasing;

change the actual connection state of the output shaft of the electric motor from the (second) IN-Connection State to the non-connection state, (1) when the value correlating with a speed of the vehicle passes over a third threshold larger than the second threshold while the value correlating with a speed of the vehicle is increasing in a case where the value correlating with a required driving torque is larger than a fourth threshold, or (2) when the value correlating with a required driving torque passes over the fourth threshold while the value correlating with a required driving torque is increasing in a case where the value correlating with a speed of the vehicle is larger than the third threshold.

In this case, it is preferable that the control means be configured so as to adjust the first threshold and the second threshold in such a manner that the first threshold becomes larger (or is increased by a positive larger amount) and the second threshold becomes smaller (or is decreased by a positive larger amount), as the temperature of a lubricating oil is lower.

It should be noted that each of the first, second, and third thresholds may be a value varying depending on the required driving torque, or be a constant. The fourth threshold may be a value varying depending on the value correlating with the speed of the vehicle, or be a constant.

According to the configuration described above, during the vehicle speed is increasing, a timing at which the changeover (shifting) from the (first) IN-Connection State to the OUT-Connection State is carried out is more delayed as the temperature of the lubricating oil is lower, and a timing at which the changeover (shifting) from the OUT-Connection State to the (second) IN-Connection State is carried out comes earlier as the temperature of the lubricating oil is lower. That is, a time period in which the OUT-Connection State is selected becomes shorter, and a time period in which the (first or second) IN-Connection State is selected becomes longer. Consequently, the temperature of the lubricating oil can be effectively increased.

In this case, it is preferable that the control means be configured so as to adjust the third threshold or the fourth threshold in such a manner that the third threshold becomes larger (or is increased by a positive larger amount) as the temperature of a lubricating oil is lower or the fourth threshold becomes larger (or is increased by a positive larger amount) as the temperature of a lubricating oil is lower. According to the configuration described above, during the vehicle speed is increasing, a timing at which the changeover (shifting) from the (second) IN-Connection State to the non-connection state is carried out is more delayed as the temperature of the lubricating oil is lower, or, during the required driving torque is increasing, a timing at which the changeover (shifting) from the (second) IN-Connection State to the non-connection state is carried out is more delayed as the temperature of the lubricating oil is lower. That is, a time period in which the (second) IN-Connection State is selected lengthens. Consequently, the temperature of the lubricating oil can be effectively increased.

Furthermore, in this case, the control means may be configured so as to fix the actual connection state of the output shaft of the electric motor to the IN-Connection State in a case where the value correlating with a speed of the vehicle is smaller than or equal to the third threshold, when the temperature of a lubricating oil is lower than a first predetermined value. According to the configuration described above, when the temperature of the lubricating oil is sufficiently low, during the vehicle speed is increasing, a time period where the OUT-Connection State is selected disappears between a time period where the first IN-Connection State is selected and a time period where the second IN-Connection State is selected. Accordingly, a time period where the (first or second) IN-Connection State is selected lengthens. Consequently, the temperature of the lubricating oil can be effectively increased.

In this case, the actual connection state of the output shaft of the electric motor is changed from the (second) IN-Connection State to the non-connection state, (1) when the value correlating with a speed of the vehicle passes over the third threshold while the value correlating with a speed of the vehicle is increasing in a case where a value correlating with a required driving torque is larger than the fourth threshold under the (second) IN-Connection State, or (2) when the value correlating with a required driving torque passes over the fourth threshold while the value correlating with a required driving torque is increasing in a case where the value correlating with a speed of the vehicle is larger than the third threshold under the (second) IN-Connection State.

Further, the control means may be configured so as to fix the actual connection state of the output shaft of the electric motor to the IN-Connection State, irrespective of (without depending on) the value correlating with a speed of the vehicle and the value correlating with a required driving torque, when the temperature of a lubricating oil is lower than a second predetermined value. According to the configuration described above, when the temperature of the lubricating oil is sufficiently low, the IN-Connection State is always selected. Accordingly, this can also increase the temperature of the lubricating oil effectively. It should be noted that the second predetermined value may be equal to the first predetermined value or may be a value smaller than the first predetermined value.

It is preferable that the vehicular power transmission control apparatus according to the present invention be applied to the automated manual transmission described above. In this case, a clutch mechanism is provided between the output shaft of the internal combustion engine and the input shaft of the transmission. The clutch mechanism can shut or provide a power transmission path between the output shaft of the internal combustion engine and the input shaft of the transmission. In addition, in this case, the transmission does not comprise the torque converter, but is the multiple gear ratio transmission which can realize any one of a plurality of predetermined reduction ratios different from one another as the transmission reduction ratio. Further, the control means is configured so as to control shutting and providing of the power transmission path by the clutch mechanism and the transmission reduction ratio (the gear position) based on the driving condition (e.g., the vehicle speed and the required driving torque) of the vehicle.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 2A is a schematic view showing one of three states which the first changeover mechanism in the transmission shown in FIG. 1 can realize;

FIG. 2B is a schematic view showing one of three states which the first changeover mechanism in the transmission shown in FIG. 1 can realize;

FIG. 2C is a schematic view showing one of three states which the first changeover mechanism in the transmission shown in FIG. 1 can realize;

FIG. 3A is a schematic view showing one of three states which the second changeover mechanism in the transmission shown in FIG. 1 can realize;

FIG. 3B is a schematic view showing one of three states which the second changeover mechanism in the transmission shown in FIG. 1 can realize;

FIG. 3C is a schematic view showing one of three states which the second changeover mechanism in the transmission shown in FIG. 1 can realize;

DETAILED DESCRIPTION OF THE INVENTION

Next will be described embodiments of a vehicular power transmission control apparatus according to the present invention with reference to the drawings.
(Configuration)

Figure 1:
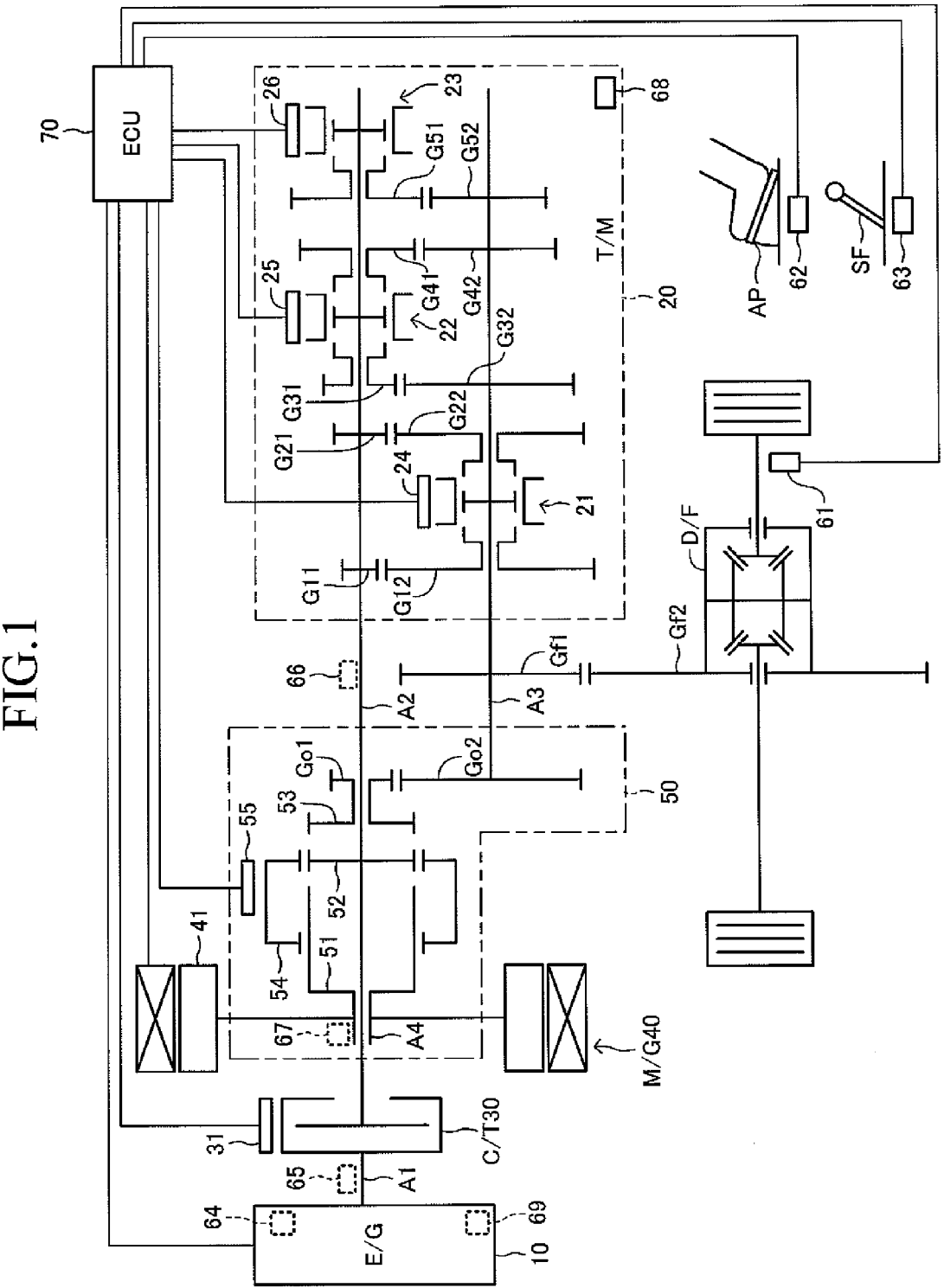
FIG. 1 is a schematic view of a vehicle which mounts a vehicular power transmission control apparatus according to an embodiment of the present invention.

FIG. 1 shows a schematic configuration of a vehicle mounting a vehicular power transmission control apparatus (hereinafter, referred to as a "present apparatus") according to an embodiment of the present invention. The present apparatus is applied to the vehicle comprising, as its power sources, an internal combustion engine and a motor generator. The vehicle comprises a so-called automated manual transmission, which uses a multiple gear ratio transmission, but which does not have a torque converter.

The vehicle comprises the engine (E/G) 10, the transmission (T/M) 20, a clutch (C/T) 30, the motor generator (M/G) 40, and a changeover mechanism 50. The E/G 10 is one of well-known internal combustion engines, including a gasoline engine which uses a gasoline as a fuel and a diesel engine which uses a light diesel oil as a fuel. An output shaft A1 of the E/G 10 is connected to an input shaft A2 of the T/M 20 through the C/T 30.

The T/M 20 is one of well-known multiple gear ratio transmission. The T/M 20 has five gear positions (a 1st, a 2nd, a 3rd, a 4th, and a 5th positions) as forward gear positions. The T/M 20 does not comprise a torque convertor. That is, the T/M 20 can set a transmission reduction ratio Gtm at any one of five ratios. The transmission reduction ratio Gtm is a ratio of a rotational speed of the input shaft A2 to a rotational speed of the output shaft A3. The gear positions are changed/shifted by controlling a first, a second, and a third changeover mechanisms 21, 22, and 23.

More specifically, as shown in FIG. 2, the first changeover mechanism 21 comprises a gear G11 axially supported by and rotatably immovable relative to the input shaft A2, a gear G12 axially supported by and rotatably movable relative to the output shaft A3 so as to always mesh with the gear G11, a gear G21 axially supported by and rotatably immovable relative to the input shaft A2, and a gear G22 axially supported by and rotatably movable relative to the output shaft A3 so as to always mesh with the gear G21. Further, the first changeover mechanism 21 comprises a connection piece 21*a* which rotates integrally with the output shaft A3, a connection piece 21*b* which rotates integrally with the gear G12, a connection piece 21*c* which rotates integrally with the gear G22, a sleeve 21*d*, and an actuator 24.

The sleeve 21*d* is provided so as to be movable in an axial direction of the output shaft A3. A position of the sleeve 21*d* along the axial direction is controlled by the actuator 24. The sleeve 21*d* is able to be spline-engaged with the connection pieces 21*a*, 21*b*, and 21*c*. When the sleeve 21*d* is at a non-connection position (neutral position) shown in FIG. 2A, the sleeve 21*d* spline-engages only with the connection piece 21*a*, and both of the gears G12 and G22 are therefore rotatably movable relative to the output shaft A3. When the sleeve 21*d* is at a 1st-gear-position-connection position shown in FIG. 2B, the sleeve 21*d* spline-engages with the connection pieces 21*a* and 21*b*. Accordingly, the gear G12 is rotatably immovable relative to the output shaft A3, whereas the gear G22 is rotatably movable relative to the output shaft A3. When the sleeve 21*d* is at a 2nd-gear-position-connection position shown in FIG. 2C, the sleeve 21*d* spline-engages with the connection pieces 21*a* and 21*c*. Accordingly, the gear G22 is rotatably immovable relative to the output shaft A3, whereas the gear G12 is rotatably movable relative to the output shaft A3.

As shown in FIGS. 3A to 3C, the second changeover mechanism 22 comprises a gear G31 axially supported by and rotatably movable relative to the input shaft A2, a gear G32 axially supported by and rotatably immovable relative to the output shaft A3 so as to always mesh with the gear G31, a gear G41 axially supported by and rotatably movable relative to the input shaft A2, and a gear G42 axially supported by and rotatably immovable relative to the output shaft A3 so as to always mesh with the gear G41. Further, the second changeover mechanism 22 comprises a connection piece 22*a* which rotates integrally with the input shaft A2, a connection piece 22*b* which rotates integrally with the gear G31, a connection piece 22*c* which rotates integrally with the gear G41, a sleeve 22*d*, and an actuator 25.

The sleeve 22*d* is provided so as to be movable in an axial direction of the input shaft A2. A position of the sleeve 22*d* along the axial direction is controlled by the actuator 25. The sleeve 22*d* is able to spline-engage with the connection pieces 22*a*, 22*b*, and 22*c*. When the sleeve 22*d* is at a non-connection position (neutral position) shown in FIG. 3A, the sleeve 22*d* spline-engages only with the connection piece 22*a*, and both of the gears G31 and G41 are therefore rotatably movable relative to the input shaft A2. When the sleeve 22*d* is at a 3rd-gear-position-connection position shown in FIG. 3B, the sleeve 22*d* spline-engages with the connection pieces 22*a* and 22*b*. Accordingly, the gear G31 is rotatably immovable relative to the input shaft A2, whereas the gear G41 is rotatably movable relative to the input shaft A2. When the sleeve 22*d* is at a 4th-gear-position-connection position shown in FIG. 3C, the sleeve 22*d* spline-engages with the connection pieces 22*a* and 22*c*. Accordingly, the gear G41 is rotatably immovable relative to the input shaft A2, whereas the gear G31 is rotatably movable relative to the input shaft A2.

Figure 4A:
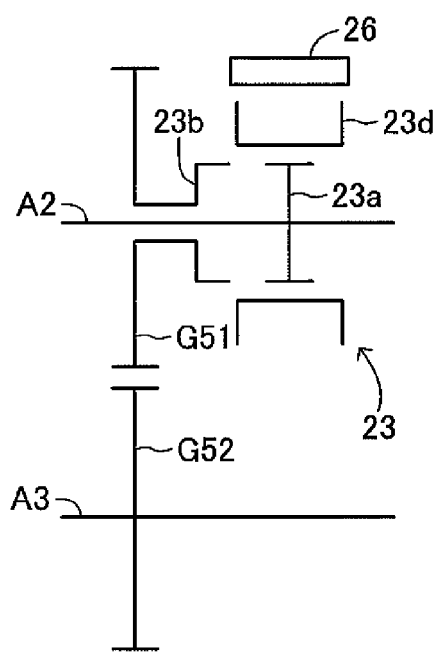
FIG. 4A is a schematic view showing one of two states which the third changeover mechanism in the transmission shown in FIG. 1 can realize.
Figure 4B:
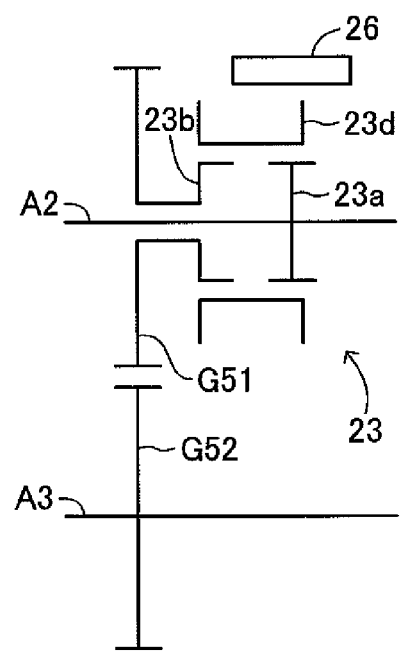
FIG. 4B is a schematic view showing one of two states which the third changeover mechanism in the transmission shown in FIG. 1 can realize.

As shown in FIGS. 4A and 4B, the third changeover mechanism 23 comprises a gear G51 axially supported by and rotatably movable relative to the input shaft A2, a gear G52 axially supported by and rotatably immovable relative to the output shaft A3 so as to always mesh with the gear G51. Further, the third changeover mechanism 23 comprises a connection piece 23*a* which rotates integrally with the input shaft A2, a connection piece 23*b* which rotates integrally with the gear G51, a sleeve 23*d*, and an actuator 26.

The sleeve 23*d* is provided so as to be movable in the axial direction of the input shaft A2. A position of the sleeve 23*d* along the axial direction is controlled by the actuator 26. The sleeve 23*d* is able to spline-engage with the connection pieces 23*a* and 23*b*. When the sleeve 23*d* is at a non-connection position (neutral position) shown in FIG. 4A, the sleeve 23*d* spline-engages only with the connection piece 23*a*, and the gears G51 is therefore rotatably movable relative to the input shaft A2. When the sleeve 23*d* is at a 5th-gear-position-connection position shown in FIG. 4B, the sleeve 23*d* spline-engages with the connection pieces 23*a* and 23*b*. Accordingly, the gear G51 is rotatably immovable relative to the input shaft A2.

When the gear position is set at "the 1st gear position", the changeover mechanisms 21, 22, and 23 are controlled to "the 1st-gear-position-connection position", "the neutral position", and "the neutral position", respectively. Consequently, a power transmission path is provided/realized between the input shaft A2 and the output shaft A3 through the gears G11, and G12, and the transmission reduction ratio Gtm becomes equal to (the number of teeth of the gear G12)/(the number of teeth of the gear G11). This value is also expressed as Gtm(1). When the gear position is set at "the 2nd gear position", the changeover mechanisms 21, 22, and 23 are controlled to "the 2nd-gear-position-connection position", "the neutral position", and "the neutral position", respectively. Consequently, a power transmission path is provided/realized between the input shaft A2 and the output shaft A3 through the gears G21, and G22, and the transmission reduction ratio Gtm becomes equal to (the number of teeth of the gear G22)/(the number of teeth of the gear G21). This value is also expressed as Gtm(2).

When the gear position is set at "the 3rd gear position", the changeover mechanisms 21, 22, and 23 are controlled to "the neutral position", "the 3rd-gear-position-connection position", and "the neutral position", respectively. Consequently, a power transmission path is provided/realized between the input shaft A2 and the output shaft A3 through the gears G31, and G32, and the transmission reduction ratio Gtm becomes equal to (the number of teeth of the gear G32)/(the number of teeth of the gear G31). This value is also expressed as Gtm(3). When the gear position is set at "the 4th gear position", the changeover mechanisms 21, 22, and 23 are controlled to "the neutral position", "the 4th-gear-position-connection position", and "the neutral position", respectively. Consequently, a power transmission path is provided/realized between the input shaft A2 and the output shaft A3 through the gears G41, and G42, and the transmission reduction ratio Gtm becomes equal to (the number of teeth of the gear G42)/(the number of teeth of the gear G41). This value is also expressed as Gtm(4).

When the gear position is set at "the 5th gear position", the changeover mechanisms 21, 22, and 23 are controlled to "the neutral position", "the neutral position", and "the 5th-gear-position-connection position", respectively. Consequently, a power transmission path is provided/realized between the input shaft A2 and the output shaft A3 through the gears G51, and G52, and the transmission reduction ratio Gtm becomes equal to (the number of teeth of the gear G52)/(the number of teeth of the gear G51). This value is also expressed as Gtm(5). In this manner, in the T/M 20, the actuators 24, 25, and 26 are controlled so that the transmission reduction ratio Gtm can be set at one of the five reduction ratios. Here, a relation Gtm(1)>Gtm(2)>Gtm(3)>Gtm(4)>Gtm(5) is satisfied.

The C/T 30 comprises a well-known structure and is configured in such a manner that the C/T 30 can break (or shut) and provide (or realize, form) a power transmission path between the output shaft A1 of the E/G 10 and the input shaft A2 of the T/M 20. In the vehicle, a clutch pedal is not provided. A state of the C/T 30 is controlled only by an actuator 31. When the C/T 30 is in a connection state, the output shaft A1 of the E/G 10 and the input shaft A2 of the T/M 20 rotate at the same rotational speed.

The M/G 40 comprises a well-known structure (e.g., an AC synchronous motor), and is configured in such a manner that the a rotor 41 rotates integrally with an output shaft A4 which is provided coaxially with and is rotatably movable relative to the input shaft A2 of the T/M 20. The M/G 40 functions as the power source as well as the electric power generator.

Figure 5:
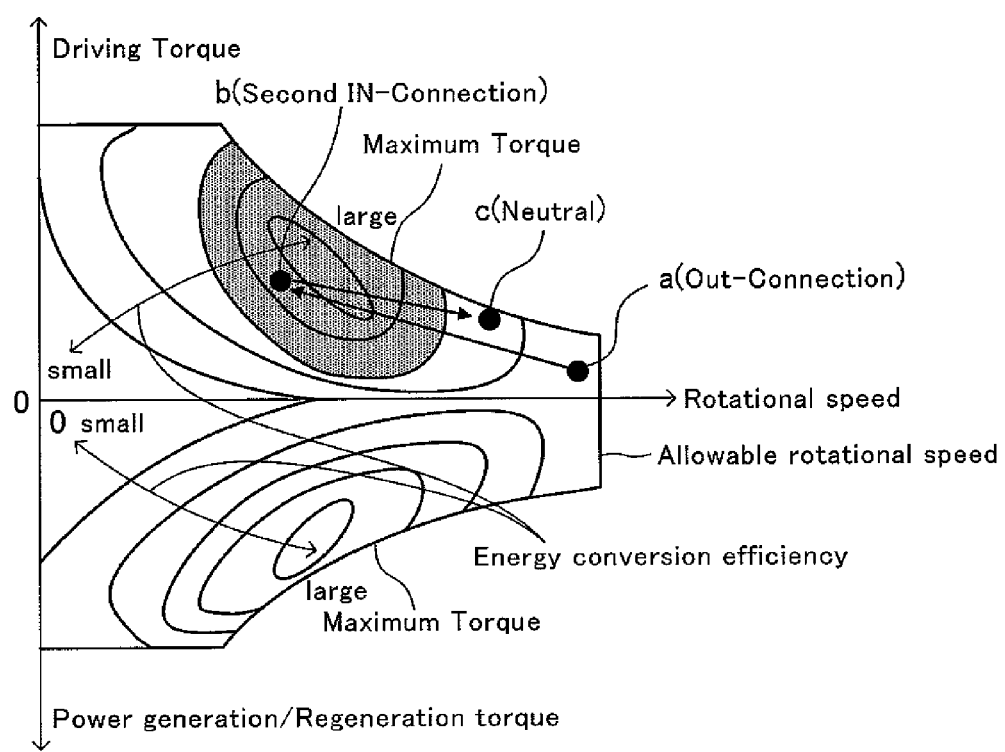
FIG. 5 is a graph showing a relation among a rotational speed, a maximum torque, and an energy conversion efficiency, of the motor generator shown in FIG. 1.

FIG. 5 shows a relation among the rotational speed of the output shaft A4 of the M/G 40, a maximum torque which the M/G 40 can generate, and the energy conversion efficiency (torque generating efficiency). As shown in FIG. 5, the maximum torque which the M/G 40 can generate is constant when the rotational speed of the output shaft A4 is smaller than a certain value, and decreases as the rotational speed increases when the rotational speed is larger than the certain value. Further, the M/G 40 does not generate any torque when the rotational speed is larger than an allowable rotational speed. In addition, the energy conversion efficiency (torque generating efficiency) can become the largest when the rotational speed of the output shaft A4 is at another certain value, and becomes smaller as an absolute value of a difference between the rotational speed and the another certain value becomes larger. That is, the energy conversion efficiency decreases as the rotational speed comes closer to the allowable rotational speed.

The changeover mechanism 50 is a mechanism which changes (over) a connection state of the output shaft A4 of the M/G 40. The changeover mechanism 50 comprises a connection piece 51 which rotates integrally with the rotor 41, a connection piece 52 which rotates integrally with the input shaft A2 of the T/M 20, a connection piece 53 axially supported by and rotatably movable relative to the input shaft A2, a sleeve 54, and an actuator 55. Further, the changeover mechanism 50 comprises a gear Go1 which rotates integrally with the connection piece 53 and is axially supported by and rotatably movable relative to the input shaft A2, and a gear Go2 which rotates integrally with the output shaft A3 of the T/M 20 and always meshes with the gear Go1.

The sleeve 54 is provided so as to be movable in the axial direction of the input shaft A2 of the T/M 20. A position of the sleeve 54 along the axial direction is controlled by the actuator 55. The sleeve 54 is able to spline-engage with the connection pieces 51, 52, and 53.

Figure 6:
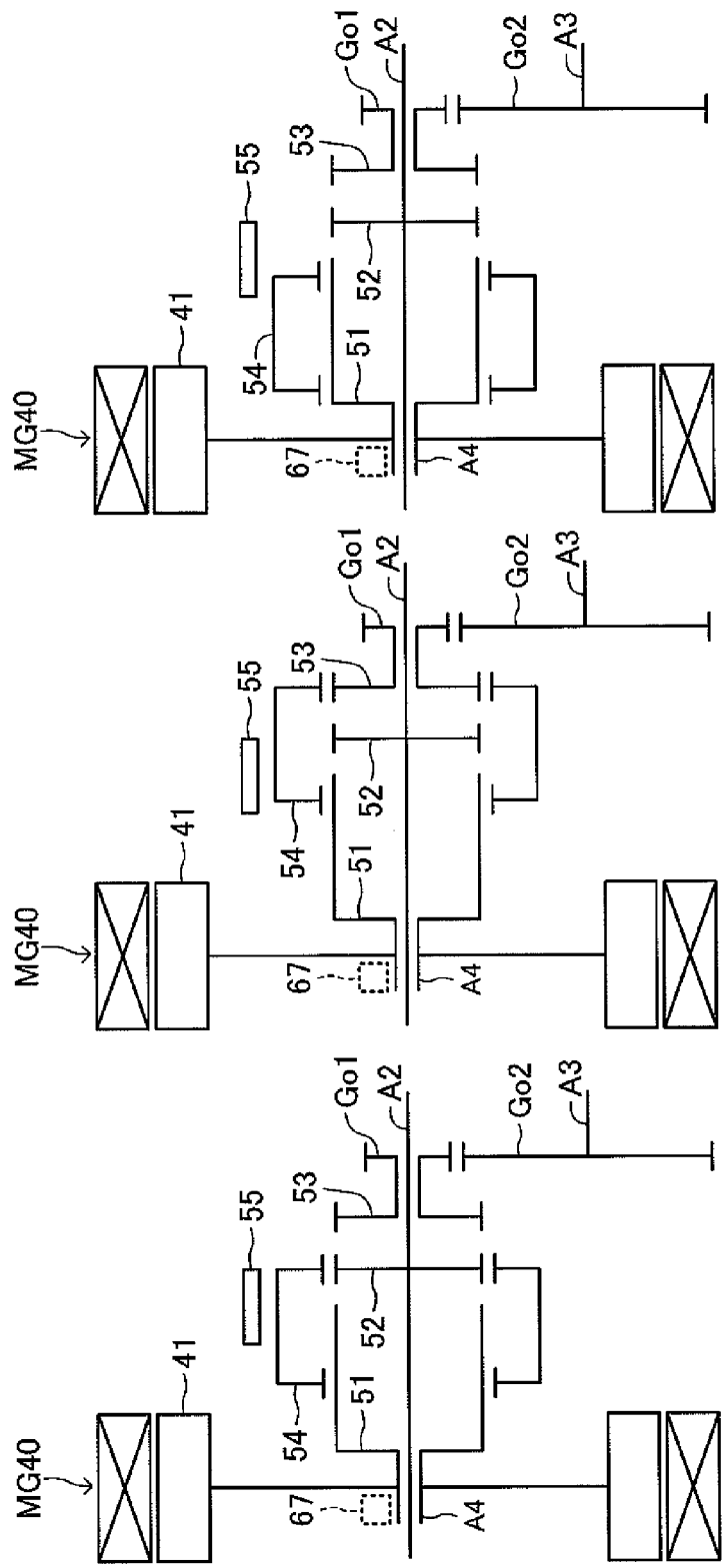
FIG. 6A is a schematic view showing one of three states which the changeover mechanism shown in FIG. 1 can realize.
FIG. 6B is a schematic view showing one of three states which the changeover mechanism shown in FIG. 1 can realize.
FIG. 6C is a schematic view showing one of three states which the changeover mechanism shown in FIG. 1 can realize.

When the sleeve 54 is controlled to an IN-Connection position shown in FIG. 6A, the sleeve 54 spline-engages with the connection pieces 51 and 52. Accordingly, the output shaft A4 of the M/G 40 and the input shaft A2 of the T/M 20 become rotatably immovable to each other. This provides/realizes a power transmission path between the input shaft A2 of the T/M 20 and the output shaft A4 of the M/G 40. This state is referred to as an "IN-Connection State".

In the IN-Connection State, a ratio of a rotational speed of the output shaft A4 of the M/G 40 to a rotational speed of the input shaft A2 of the T/M 20 is referred to as a "first reduction ratio G1", and a product (G1·Gtm) of the first reduction ratio G1 and the transmission reduction ratio Gtm is referred to as an "IN-connection reduction ratio Gin". In the present example, G1=1, and therefore Gin=Gtm. That is, the IN-connection reduction ratio Gin varies in accordance with the gear position of the T/M 20.

When the sleeve 54 is controlled to an OUT-Connection position shown in FIG. 6B, the sleeve 54 spline-engages with the connection pieces 51 and 53. Accordingly, the output shaft A4 of the M/G 40 and the gear Go1 become rotatably immovable to each other. This provides/realizes a power transmission path between the output shaft A3 of the T/M 20 and the output shaft A4 of the M/G 40 through the gear Go1 and the gear Go2, without involving the T/M 20. This state is referred to as an "OUT-Connection State".

In the OUT-Connection State, a ratio of a rotational speed of the output shaft A4 of the M/G 40 to a rotational speed of the output shaft A3 of the T/M 20 is referred to as an "OUT-connection reduction ratio Gout". In the present example, the OUT-connection reduction ratio Gout is equal to (the number of teeth of the gear Go2)/(the number of teeth of the gear Go1) and thus is constant. That is, the OUT-connection reduction ratio Gout does not vary in accordance with a change in the gear position of the T/M 20. In the present example, the OUT-connection reduction ratio Gout is set at a value which is roughly equal to the Gtm(2), for example.

When the sleeve 54 is controlled to a non-connection position (neutral position) shown in FIG. 6C, the sleeve 54 spline-engages only with the connection piece 51. Accordingly, both the input shaft A2 and the gear Go1 are rotatably movable relative to the output shaft A4. Accordingly, neither a power transmission path between the output shaft A3 of the T/M 20 and the output shaft A4 nor a power transmission path between the input shaft A2 of the T/M 20 and the output shaft A4 is provided. This state is referred to as a "non-connection state (neutral state)".

As described above, the changeover mechanism 50 selectively changes the connection state of the output shaft A4 of the M/G 40 into one of "the IN-Connection State", "the OUT-Connection State", and "the neutral connection state".

As shown in FIG. 1, a gear Gf1 is axially supported by and rotatably immovable relative to the output shaft A3 of the T/M 20. The gear Gf1 always meshes with a gear Gf2. The gear Gf2 is connected with a differential mechanism D/F comprising one of well-known configurations. The differential mechanism D/F is connected a pair of drive wheels including a left drive wheel and a right drive wheel. It should be noted that the (the number of teeth of the gear Gf2)/(the number of teeth of the gear Gf1) corresponds to a so-called final reduction ratio.

The present apparatus further comprises a wheel speed sensor 61 which detects a wheel speed of the drive wheels, an acceleration pedal opening degree sensor 62 which detects an operation amount of an acceleration pedal AP, and a shift position sensor 63 which detects a position of a shift lever SF, an oil temperature sensor 68 which detects a temperature (lubricating oil temperature) of a lubricating oil in the T/M 20.

The present apparatus further comprises an electronic control unit ECU 70. The ECU 70 controls the actuators 24, 25, 26, 31, and 55, based on information and so on from the sensors 61-63, and 68 to thereby control the gear position of the T/M 20 and the state of the C/T 30. Further, the ECU 70 controls the output (driving torque) of each of the E/G 10 and M/G 40, and so on.

The gear position of the T/M 20 is controlled based on a vehicle speed V obtained from the wheel speed sensor 61, a required driving torque T calculated based on the operation amount of the acceleration pedal AP obtained from the acceleration pedal opening degree sensor 62, and the shift lever position SF obtained from the shift position sensor 63. When the shift lever position SF is at a position corresponding to a "manual mode", the gear position of the T/M 20 is basically set at a gear position selected by the driver who operates the shift lever SF. On the other hand, when the shift lever position SF is at a position corresponding to an "automatic mode", the gear position of the T/M 20 is automatically controlled to one of the 1st to the 5th gear positions in accordance with "a combination of the vehicle speed V and the required driving torque T" and "the Map" shown in FIG. 7, even when the shift lever SF is not operated.

Figure 7:
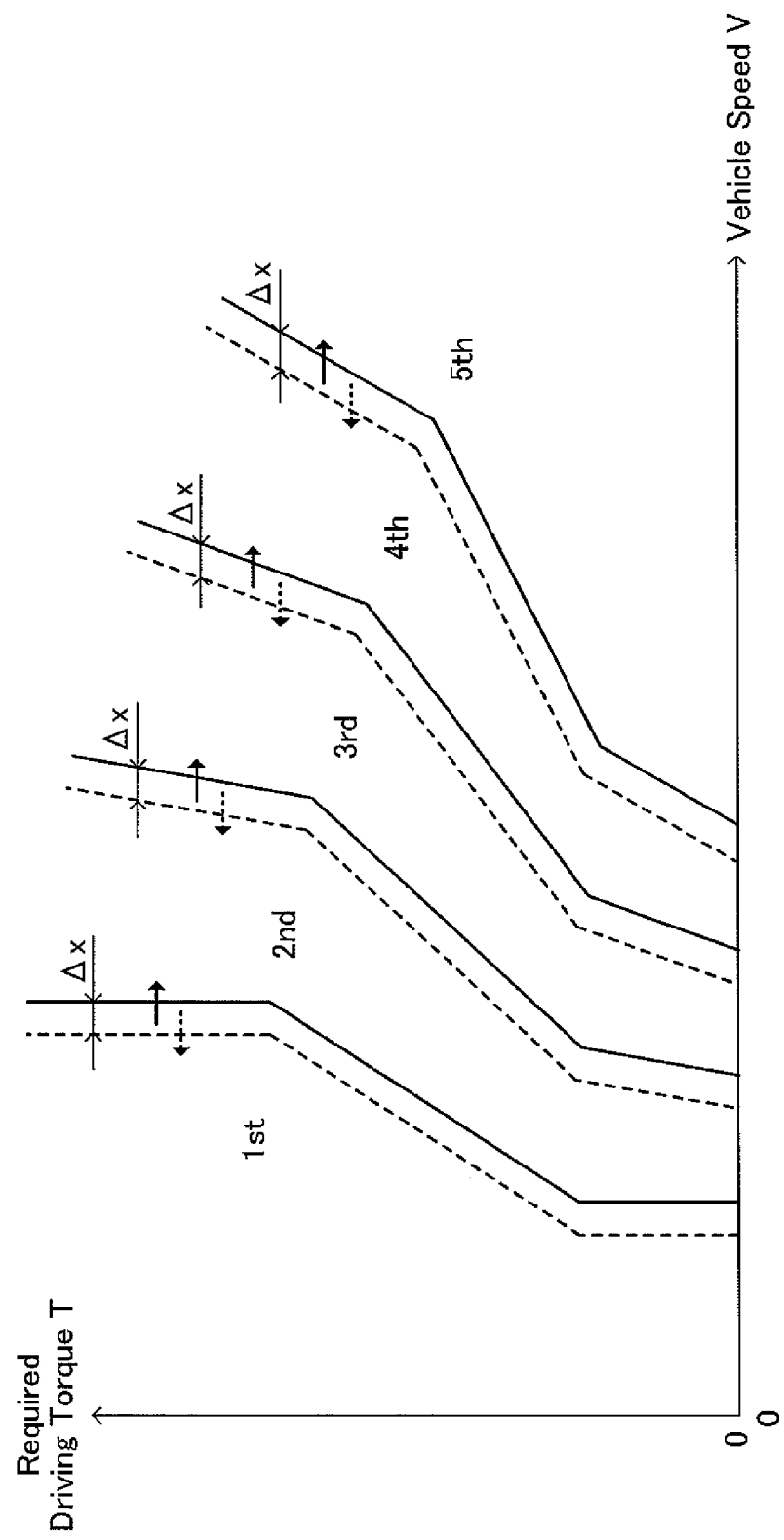
FIG. 7 is a graph showing a relation among a vehicle speed and a required driving torque as well as a gear position of the transmission to be selected, in the embodiment shown in FIG. 1.

In FIG. 7, each of the solid lines shows each of boundary lines which causes a shift up (a shift up operation, or a gear position change operation to decrease the transmission reduction ratio Gtm) with an increase in the vehicle speed V, and each of the dashed lines shows each of boundary lines which causes a shift down (a shift down operation, or a gear position change operation to increase the transmission reduction ratio Gtm) with a decrease in the vehicle speed V. The reason why a difference $\Delta x$ is provided between the each solid line and the each dashed line as shown is to suppress an occurrence of a case (so-called hunting) in which the shift up and the shift down are performed frequently even though they are not necessary, when the vehicle speed V fluctuates (increases and decreases) around each of the values corresponding the solid lines.

A state of the C/T 30 is generally kept at the connection state, and is temporarily changed from the connection state to the non-connection state during the shift up operation and the shift down operation, and so on.

The M/G 40 is used as a driving power source generating a driving torque for driving the vehicle together with the E/G 10 or by itself, or is used as a power source for starting the E/G 10. Further, the M/G 40 is used as an electric motor generator for generating a regeneration torque to provide a breaking force to the vehicle, or is used as an electric motor generator for generating an electric power which is supplied to and stored in a battery (not shown) of the vehicle.

When the M/G 40 is used as the driving power source for driving the vehicle, a distribution between the output (driving torque) of the E/G 10 and the output (driving torque) of the M/G 40 is adjusted in such a manner that a sum of the driving torque transmitted to the drive wheels based on the output of the E/G 10 and the driving torque transmitted to the drive wheels based on the output of the M/G 40 coincides with the required driving torque T, according to one of well-known methods.

(Selection of the Connection State of the Output Shaft A4 of the M/G 40)

Next will be described how to select the (a target) connection state of the output shaft A4 of the M/G 40. The connection state of the output shaft A4 of the M/G 40 is automatically selected in accordance with "a combination of the vehicle speed V and the required driving torque T" and the map shown in FIG. 8.

Figure 8:
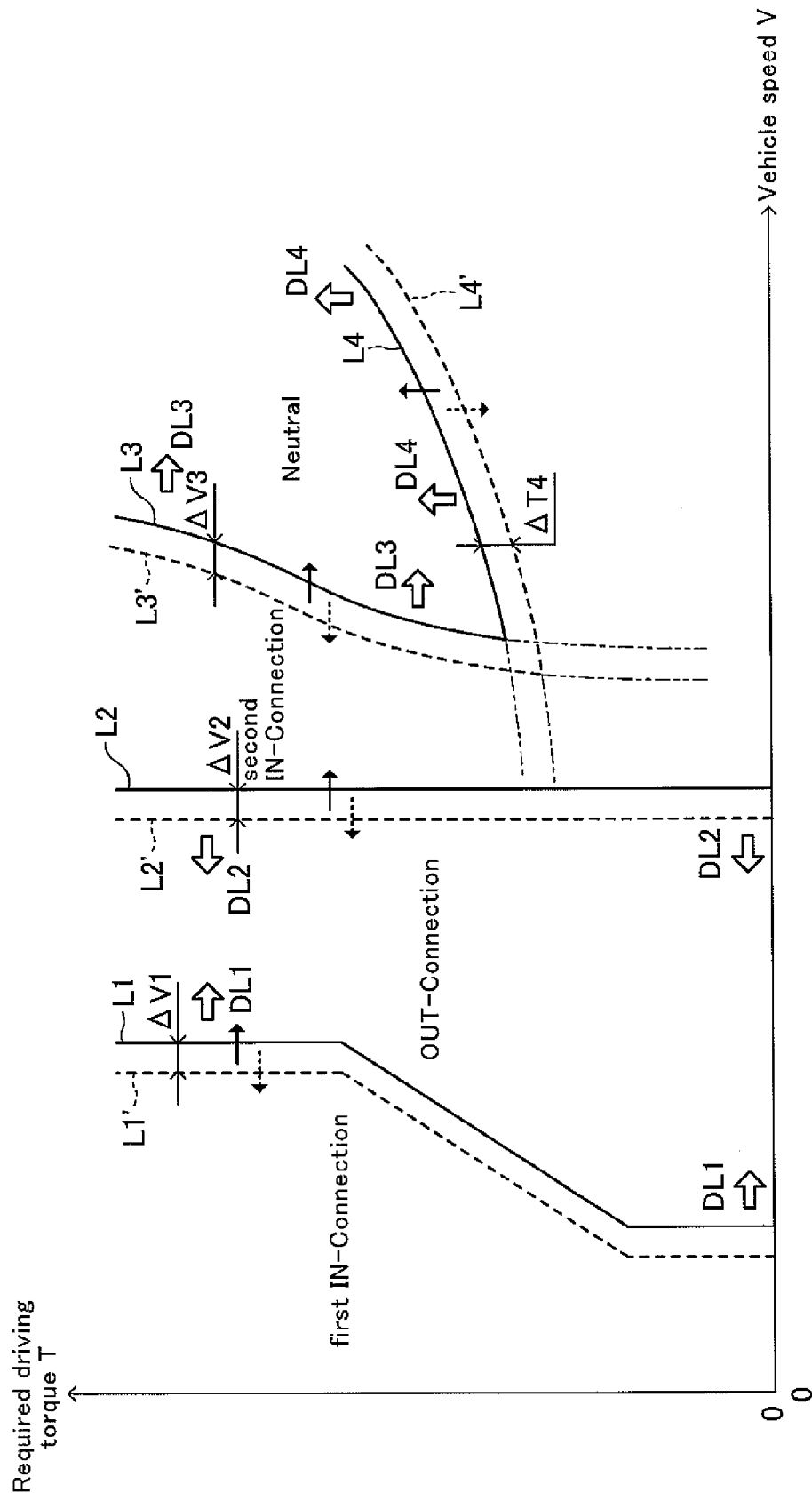
FIG. 8 is a graph showing a relation among the vehicle speed and the required driving torque, as well as a connection state to be selected in the changeover mechanism, in the embodiment shown in FIG. 1.

As shown in FIG. 8, four areas (or regions) are defined with respect to "the combination of the vehicle speed V and the required driving torque T", i.e., a first IN-Connection area, an OUT-Connection area, a second IN-Connection area, and a neutral area (non-connection area). In the first and second IN-Connection areas, "the In-Connection State" is selected. In the OUT-Connection area, "the OUT-Connection State" is selected. In the neutral area, "the neutral-connection state (non-connection state)" is selected. Hereinafter, "the IN-Connection States" corresponding to the first IN-Connection area and the second IN-Connection area are referred separately to as "a first IN-Connection State" and "a second IN-Connection State", respectively.

A changeover from "the first IN-Connection State" to "the OUT-Connection State" is carried out, when the vehicle speed V passes through/over the boundary line L1 (corresponding to "the first threshold" described above) while the vehicle speed V is increasing. A changeover from "the OUT-Connection State" to "the second IN-Connection State" is carried out, when the vehicle speed V passes through/over the boundary line L2 (corresponding to "the second threshold" described above) while the vehicle speed V is increasing. A changeover from "the second IN-Connection State" to "the neutral state" is carried out, (1) when the vehicle speed V passes through/over the boundary line L3 (corresponding to "the third threshold" described above) while the vehicle speed V is increasing in a case where the required driving torque T is larger than the boundary line L4 (corresponding to "the fourth threshold" described above), or (2) when the required driving torque T passes through/over the boundary line L4 while the required driving torque T is increasing in a case where the vehicle speed V is larger than the boundary line L3.

In the meantime, a changeover from "the OUT-Connection State" to "the first IN-Connection State" is carried out, when the vehicle speed V passes through/over the boundary line L1' while the vehicle speed V is decreasing. A changeover from "the second IN-Connection State" to "the OUT-Connection State" is carried out, when the vehicle speed V passes through/over the boundary line L2' while the vehicle speed V is decreasing. A changeover from "the neutral state" to "the second IN-Connection State" is carried out, (1) when the vehicle speed V passes through/over the boundary line L3' while the vehicle speed V is decreasing, or (2) when the required driving torque T passes through/over the boundary line L4' while the required driving torque is decreasing.

The reason why differences $\Delta V1$, $\Delta V2$, $\Delta V3$, and $\Delta T4$ between the boundary lines L1 and L1', between the boundary lines L2 and L2', between the boundary lines L3 and L3', and between the boundary lines L4 and L4', respectively, are provided is to suppress an occurrence of a case (so-called hunting) in which the changeover of the connection state of the output shaft A4 are performed frequently, when the vehicle speed V fluctuates (increases and decreases) around each of the boundary lines L1, L2, and L3 or when the required driving torque T fluctuates (increases and decreases) around the boundary lines L4.

The boundary line L1 (low speed area) is set at a vehicle speed slightly smaller than a vehicle speed corresponding to the shift up from the 1st gear position to the 2nd gear position. That is, the boundary line L1 is provided at a location obtained by slightly shifting (moving) the boundary line (the solid line) corresponding to the shift up from the 1st gear position to the 2nd gear position shown in FIG. 7 in a direction (leftward direction in the figure) in which the vehicle speed V decreases. Accordingly, the boundary line L1 shown in FIG. 8 has the same shape as "the boundary line (the solid line) shown in FIG. 7" corresponding to the shift up from the 1st gear position to the 2nd gear position.

The boundary line L2 (middle speed area) is set at a vehicle speed obtained when the rotational speed of the output shaft A4 of the M/G 40 in "the OUT-Connection State" coincides with a value (e.g. a value slightly smaller than the allowable rotational speed) determined based on the allowable rotational speed (refer to FIG. 5). Further, in the present example, the boundary line L2 is located in a region corresponding to the 3rd gear position to the 5th gear position shown in FIG. 7. As described above, the OUT-connection reduction ratio Gout is constant (e.g., a ratio roughly equal to the Gtm(2) in the present example) irrespective of the gear position of the T/M 20. Accordingly, in the OUT-Connection State, a vehicle speed at which the rotational speed of the output shaft A4 of the M/G 40 coincides with "the above described value determined based on the allowable rotational speed" is determined as a single value, irrespective of the gear position of the T/M 20. Therefore, the vehicle speed V corresponding to the boundary line L2 shown in FIG. 8 is constant irrespective of the required driving torque T. That is, the boundary line L2 becomes a line extending in a vertical direction in FIG. 8. The vehicle speed V corresponding to the boundary line L2 is determined based on "the OUT-connection reduction ratio" and "the final reduction ratio" described above.

The boundary line L3 (high speed area) is set at a vehicle speed obtained when the energy conversion efficiency (in the driving torque side) of the M/G 40 in "the (second) IN-Connection State" coincides with a boundary (especially at the side where the vehicle speed is larger, or the rightward side in the figure) defining an area (refer to an area where fine dots are provided in FIG. 5) in which the energy conversion efficiency of the M/G 40 is larger than or equal to a predetermined value (e.g., 70%).

The boundary line L4 is determined based on a torque of the drive wheels with respect to the running resistance of the vehicle (a total sum of a frictional resistance of each of various rotational members included in a driving system, a resistance to decelerate the vehicle due to a wind generated with the running of the vehicle, and a resistance to decelerate the vehicle due to an inclination of a road, and so on). Hereinafter, the torque of the drive wheels with respect to the running resistance of the vehicle is referred to as a "running resistance torque". When the running resistance torque is equal to the driving torque of the drive wheels, the acceleration (front-rear acceleration) of the vehicle in the front-rear direction of the vehicle becomes zero. When the driving torque of the drive wheels is larger (or smaller) than the running resistance torque, the front-rear acceleration becomes positive (or negative). Accordingly, the boundary line L4 is set at, for example, a driving torque which makes the front-rear acceleration coincide with a predetermined value (for example, zero, a positive slight value, or a negative slight value). That is, the boundary line L4 may be determined/set based on the front-rear acceleration of the vehicle or a parameter (for example, a change rate in the vehicle speed, a change rate in the rotational speed of the engine) correlating with the front-rear acceleration of the vehicle.

The running resistance torque increases as the vehicle speed increases. Accordingly, as shown in FIG. 8, the boundary L4 increases as the vehicle speed increases. In addition, the running resistance torque becomes larger as the upward inclination of the road becomes larger. Therefore, the boundary line L4 shifts more upwardly as the upward inclination of the road becomes larger. When the required driving torque T is larger than a value corresponding to the boundary line L4, the condition of the vehicle is in an acceleration condition. When the required driving torque T is smaller than the value corresponding to the boundary line L4, the condition of the vehicle is in a deceleration condition.

Next will be described advantages obtained by selecting the connection state of the output shaft A4 of the M/G 40 as shown in FIG. 8. Notably, it is assumed that the OUT-connection reduction ratio Gout is roughly equal to the Gtm(2), for example and just for description convenience.

First, the function/effect realized by "a feature that "the (first) In-Connection State" is selected after the vehicle starts to drive when the vehicle speed V is zero" is described. Generally, when the vehicle starts to drive, the gear position of the T/M 20 is set at the 1st gear position, and the IN-connection reduction ratio Gin (=Gtm(1)) is therefore larger than the OUT-connection reduction ratio Gout. Accordingly, the driving torque, which is transmitted to the drive wheels and which is based on the output of the M/G 40, can be made larger, compared to a case where the OUT-Connection State is selected. Consequently, a large driving torque at the drive wheels can be generated when the vehicle starts to drive.

Next, the function/effect realized by "a feature that the boundary line L1 is set at the vehicle speed slightly smaller than the vehicle speed corresponding to the shift up from the 1st gear position to the 2nd gear position" is described. When the vehicle speed passes through/over the boundary line L1 (low speed area) while the vehicle speed is increasing under the "the (first) In-Connection State" after the start of the vehicle, the changeover from the "the (first) In-Connection State" to "the OUT-Connection State" is carried out. This changeover occurs before the shift up from the 1st gear position to the 2nd gear position is carried out. In other words, the shift up from the 1st gear position to the 2nd gear position is carried out under "the OUT-Connection State" after the changeover to the OUT-Connection State is completed. As described in the summary of the present invention, the "OUT-Connection State" allows the driving torque of the M/G 40 to be continuously transmitted to the output shaft A3 of the T/M 20 (and therefore to the drive wheels) even during the gear position shifting operation by the T/M 20, and the shift shock can therefore be suppressed. Especially, a severe shift shock tends to occur when the gear position is changed from the 1st gear position to the 2nd gear position, since the change amount in the transmission reduction ratio Gtm is large. In view of the above, it is possible to remarkably moderate the shift shock which occurs when the gear position is changed from the 1st gear position to the 2nd gear position by the feature described above.

Furthermore, the changeover from "the (first) In-Connection State" to "the OUT-Connection State" is carried out under the 1st gear position. That is, this changeover from "the (first) In-Connection State" to "the OUT-Connection State" is carried out while the OUT-connection reduction ratio Gout (roughly equal to Gtm(2)) is smaller than the IN-connection reduction ratio Gin (=Gtm(1)). Accordingly, this changeover decreases the rotational speed of the output shaft A4 of the M/G 40. It should be reminded that, as described above, the maximum torque which the M/G 40 can generate becomes larger as the rotational speed of the output shaft A4 is smaller (refer to FIG. 5). Therefore, the changeover described above can also provide the effect that the maximum torque which the M/G 40 can generate is increased.

Next will be described the function/effect realized by "a feature that the boundary line L2 is set at the vehicle speed obtained when the rotational speed of the output shaft A4 in "the OUT-Connection State" coincides with the value determined based on the allowable rotational speed". When the vehicle speed passes through/over the boundary line L2 while the vehicle speed is increasing under "the OUT-Connection State", the changeover from the "OUT-Connection State" to "the (second) IN-Connection State" is carried out. As described above, the boundary line L2 is located in the region corresponding to the 3rd gear position to 5th gear position shown in FIG. 7. Accordingly, this changeover occurs while one of the 3rd, 4th, and 5th gear positions (i.e., the gear positions higher than or equal to the 3rd gear position) is selected. That is, this changeover occurs while the IN-connection reduction ratio Gin (=one of Gtm(3), Gtm(4), and Gtm(5)) is smaller than the OUT-connection reduction ratio Gout. Accordingly, this changeover allows the rotational speed of the output shaft A4 of the M/G 40 to decrease from a value close to the allowable rotational speed (refer to a movement from a point "a" to a point "b" in FIG. 5). As a result, the rotational speed of the output shaft A4 can be retained smaller than the allowable control rotational speed. In addition, the maximum torque that the M/G 40 can generate can be increased.

Next will be described a function/effect realized by "a feature that the boundary line L3 is set at the vehicle speed obtained when the energy conversion efficiency of the M/G 40 under "the (second) IN-Connection State" coincides with the boundary defining the area in which the energy conversion efficiency of the M/G 40 under "the (second) IN-Connection State" is larger than or equal to the predetermined value". When the vehicle speed passes through/over the boundary line L3 while the vehicle speed is increasing under "the (second) IN-Connection State" and under a condition where the required driving torque T is larger than the boundary line L4 (i.e., when the vehicle is in the acceleration condition), the changeover from "the (second) IN-Connection State" to "the non-connection state" is carried out. Consequently, driving the M/G 40 is stopped, and a driving torque equal to the required driving torque T is generated only by the E/G 10. A timing at which the vehicle speed passes through/over the boundary line L3 while the vehicle speed is increasing (i.e., while the rotational speed of the output shaft A4 of the M/G 40 is increasing) means a timing at which the energy conversion efficiency of the M/G 40 passes thorough/over a part of the boundary defining the area in which the fine dots are provided in FIG. 5, the part being at a higher vehicle speed side (rightward side in FIG. 5) (refer to a movement from a point "b" to a point "c" in FIG. 5). That is, when a state of the M/G 40 has changed from a state in which the energy conversion efficiency is larger than or equal to the predetermined value to a state in which the energy conversion efficiency is smaller than the predetermined value, the changeover from "the second IN-Connection State" to "the non-connection state" is carried out. In the meantime, an energy generation efficiency of the E/G 10 is generally high in the high speed area where the energy conversion efficiency of the M/G 40 is low in most cases. In this state, the total energy efficiency (fuel consumption) of the vehicles as a whole can be more improved by having only the E/G 10 generate the driving torque equal to the required driving torque T than by having both the M/G 40 and the E/G 10 cooperatively generate the driving torque equal to the required driving torque T. In view of the above, the total energy efficiency (fuel consumption) of the vehicles as a whole can be improved in a case in which the vehicle is in the acceleration condition and the energy conversion efficiency of the M/G 40 in the high speed area under "the (second) IN-Connection State" is lower than the predetermined value.

Next will be described a function/effect realized by the feature described above that "the boundary L4 is set at the predetermined value obtained when the front-rear acceleration coincides with the predetermined value (for example, zero, a positive slight value, or a negative slight value)". In a case where the vehicle is in the acceleration condition, it is preferable that, as described above, the changeover from "the (second) IN-Connection State" to "the non-connection state" be carried out when the vehicle speed passes through/over the boundary line L3 while the vehicle speed is increasing, in order to improve the energy conversion efficiency (fuel consumption) of the vehicle as a whole. To the contrary, in a case where the vehicle is in the deceleration condition (that is, the required driving torque T is smaller than the boundary line L4), it is possible to supply an electric power to the battery to store the power in the battery, the electric power being generated by a regeneration by having the M/G 40 generate the regeneration torque by retaining "the (second) IN-Connection State". That is, in this case, selecting "the (second) IN-Connection State" instead of "the non-connection state" can more improve the total energy efficiency (fuel consumption) of the vehicle as a whole. In view of the above, in the case where the vehicle is in the deceleration condition, "the (second) IN-Connection State" is preferably retained even though the vehicle speed is larger than the value corresponding to the boundary line L3.

(Adjusting the Connection State Based on a T/M Oil Temperature)

In the present apparatus, as shown in FIG. 8, positions of the boundary lines L1 and L1' are shifted from the reference (original) positions shown in FIG. 8 by a shift amount DL1 in a direction (rightward direction in FIG. 8, a direction of vehicle speed V increase) along which the vehicle speed V increases, in accordance with the temperature (hereinafter, referred to as a "T/M oil temperature") of the lubricating oil in the T/M 20. Positions of the boundary lines L2 and L2' are shifted from the reference (original) positions shown in FIG. 8 by a shift amount DL2 in a direction (leftward direction in FIG. 8, a direction of vehicle speed V decrease) along which the vehicle speed V decreases, in accordance with the T/M oil temperature. Positions of the boundary lines L3 and L3' are shifted from the reference (original) positions shown in FIG. 8 by a shift amount DL3 in the direction of vehicle speed V increase, in accordance with the T/M oil temperature. Positions of the boundary lines L4 and L4' are shifted from the reference (original) positions shown in FIG. 8 by a shift amount DL4 in a direction (upward direction in FIG. 8, a direction of required driving torque increase) along which the required driving torque T increases, in accordance with the T/M oil temperature. Hereinafter, the shift amounts DL1-DL4 may also be expressed as and represented by "DL*".

Figure 9:
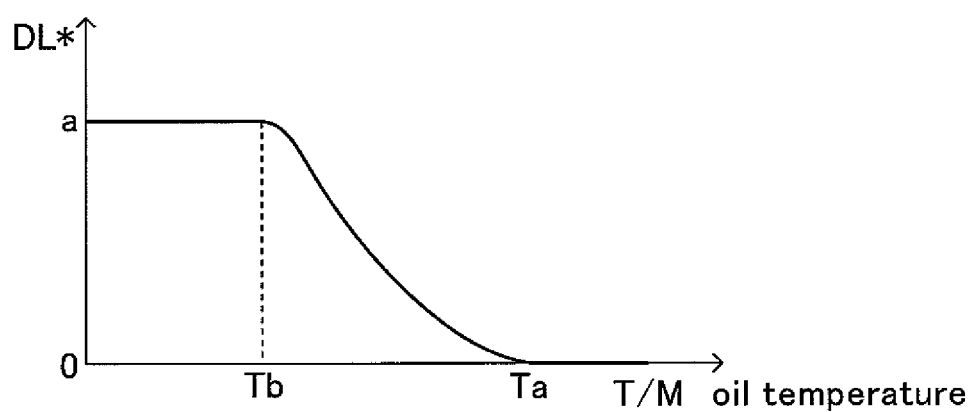
FIG. 9 is a graph showing a relation between a lubricating oil temperature and a shifting amount of a boundary line, in the embodiment shown in FIG. 1.

FIG. 9 is a graph showing a relation between the T/M oil temperature and the shift amount DL*. As shown in FIG. 9, the shift amount DL* is zero when the T/M oil temperature is larger than or equal to a predetermined value Ta. The shift amount DL* increases from zero as the T/M oil temperature decreases, when the T/M oil temperature is smaller than the predetermined value Ta. The shift amount DL* becomes a constant which is a maximum value a, when the T/M oil temperature is smaller than another predetermined value Tb smaller than the predetermined value Ta (Tb<Ta). The predetermined values Ta, Tb and the maximum value a for any of the shift amounts DL1-DL4 may be the same as or different from the predetermined values Ta, Tb and the maximum value a for another one of the shift amounts DL1-DL4, respectively. That is, for example, The predetermined values Ta for the shift amount DL1 may be the same as or be different from the predetermined values Ta for one of the shift amounts DL2, DL3, and DL4.

Accordingly, it is understood from FIG. 8 that the first and second IN-Connection areas are expanded (enlarged, becomes wider/larger), and the OUT-Connection areas and the neutral area are narrowed (becomes narrower/smaller), as the T/M oil temperature is lower. That is, a possibility that the first and second IN-Connection States are selected becomes higher, as the T/M oil temperature becomes lower. In other words, the first and second IN-Connection States are selected more frequently (i.e., an ease by which the first and second IN-Connection States are selected is increased (made greater)), as the T/M oil temperature becomes lower.

Next will be described a function/effect realized by the feature described above. The output of the M/G 40 is not transmitted to the T/M 20 under the OUT-Connection State and the non-connection state, whereas the output of the M/G 40 is transmitted to the TM 20 under the (first and second) IN-Connection State. Generally, an amount of heat generated from mesh portions of gears and movable members such as bearings in the T/M 20 is greater, as the output transmitted to the T/M 20 is larger. Accordingly, the T/M oil temperature tends to be (or easily become) higher by an amount depending on the output transmitted to the T/M 20 from the M/G 40 under the IN-Connection State, compared to under the OUT-Connection State or the non-connection state.

On the other hand, when the T/M oil temperature is low, a viscosity of the lubricating oil is high. Accordingly, a rotational resistance of each of various rotating shafts or members in the T/M 20 becomes large. As a result, the energy efficiency (fuel consumption) decreases due to the large power loss within the T/M 20. In view of the above, it is desirable to increase/raise the T/M oil temperature as early as possible, when the T/M oil temperature is low.

As described above, in the present apparatus, the (first or second) IN-Connection State is more easily and more frequently selected, as the T/M oil temperature is lower. Accordingly, the present apparatus can lengthen a time period in which the output of the M/G 40 is transmitted to the T/M 20 when the T/M oil temperature is low, and can thereby increase/raise the T/M oil temperature effectively. Consequently, the present apparatus can improve the energy efficiency (fuel consumption) of the vehicle, compared to a case where the boundary limes L1-L4 are fixed to the reference positions shown in FIG. 8.

As described above, the vehicular power transmission control apparatus according to the embodiment of the present invention is applied to the vehicle comprising, as power sources, the E/G 10 and the M/G 40, and further comprising the so-called automated manual transmission utilizing the T/M 20 which does not comprise a torque convertor. The apparatus comprises the changeover mechanism 50 which can select, as the connection state of the output shaft A4 of the M/G 40, one of "the IN-Connection State", "the OUT-Connection State", and "the non-connection state". The IN-Connection State is the state in which the power transmission path between the input shaft A2 of the T/M 20 and the output shaft A4 of the M/G 40 is provided/made/realized. The OUT-Connection State is the state in which the power transmission path between the output shaft A3 of the T/M 20 and the output shaft A4 of the M/G 40 is provided/made/realized. The non-connection state is the state in which no power transmission path among these shafts is provided/made/realized. The selection for the connection state is made based on the combination (area) of the vehicle speed V and the required driving torque T. As for the changeovers, the IN-connection-areas is more enlarged, and the OUT-connection area and the neutral area (NON-connection area) is more narrowed (or is made narrower), as the T/M oil temperature is lower. That is, a possibility of selecting the IN-Connection States becomes higher, as the T/M oil temperature becomes lower. In other words, the IN-Connection State is selected more frequently (an ease by which the IN-Connection State is selected is increased), as the T/M oil temperature becomes lower. As a result, the present apparatus can improve the energy efficiency (fuel consumption) of the vehicle.

The present invention is not limited to the embodiment described above, but may be modified as appropriate without departing from the scope of the invention. For example, the so-called automated manual transmission which uses the multiple gear ratio transmission but which does not include a torque converter is used as the transmission, however, a multiple gear ratio transmission or a continuously variable transmission (a so-called automatic transmission (AT)) may be used as the transmission, each including a torque convertor and automatically performing an operation for a gear position change in accordance with the vehicle driving condition. In this case, the C/T 30 is omitted.

Further, a transmission (a so-called manual transmission (MT)) may be used as the transmission, the manual transmission being a multiple gear ratio transmission without the torque converter, performing an operation for a gear position change directly (without using an actuator) by an operation of a link mechanism caused by an operating force supplied to the shift lever from the driver.

Further, in the embodiment described above, the changeover mechanism 50 is configured so as to be able to select any one from "the IN-Connection State", "the OUT-Connection State", and "the non-connection state (the neutral state)", however, the changeover mechanism 50 may be configured so as to be able to select any one from only "the IN-Connection State and the OUT-Connection State". In this case, the boundary lines L3, L3', L4 and L4' shown in FIG. 8 are omitted so that the neutral area in FIG. 8 is united/merged into the (second) IN-Connection area. Furthermore, the changeover mechanism 50 may be configured so as to be able to select any one from only "the IN-Connection State and non-connection state (the neutral state)". In this case, the boundary lines L1, L1', L2, and L2' shown in FIG. 8 are omitted so that the OUT connection area disappears, and the first and second IN connection areas are united/merged into a single IN-Connection area.

Further, in the embodiment described above, the connection state of the output shaft A4 of the M/G 40 is selected/determined based on the combination of the vehicle speed V and the required driving torque T (refer to FIG. 8), but the connection state of the output shaft A4 of the M/G 40 may be selected/determined based on a combination of "any one from the vehicle speed V, the rotational speed of the output shaft A1 of the E/G 10, the rotational speed of the input shaft A2 of the T/M 20, and the rotational speed of the output shaft A4 of the M/G 40" and "any one from the required driving torque T, the operation amount of the acceleration pedal AP, and the opening degree of a throttle valve (not shown) disposed in an intake passage of the E/G 10". The opening degree of the throttle valve may be obtained from a throttle valve opening degree sensor 64. The rotational speed of the output shaft A1 of the E/G 10, the rotational speed of the input shaft A2 of the T/M 20, and the rotational speed of the output shaft A4 of the M/G 40 may be obtained from a rotational speed of the engine output shaft sensor 65, a rotational speed of the transmission input shaft sensor 66, and a rotational speed of the electric motor output shaft sensor 67, respectively.

Figure 10:
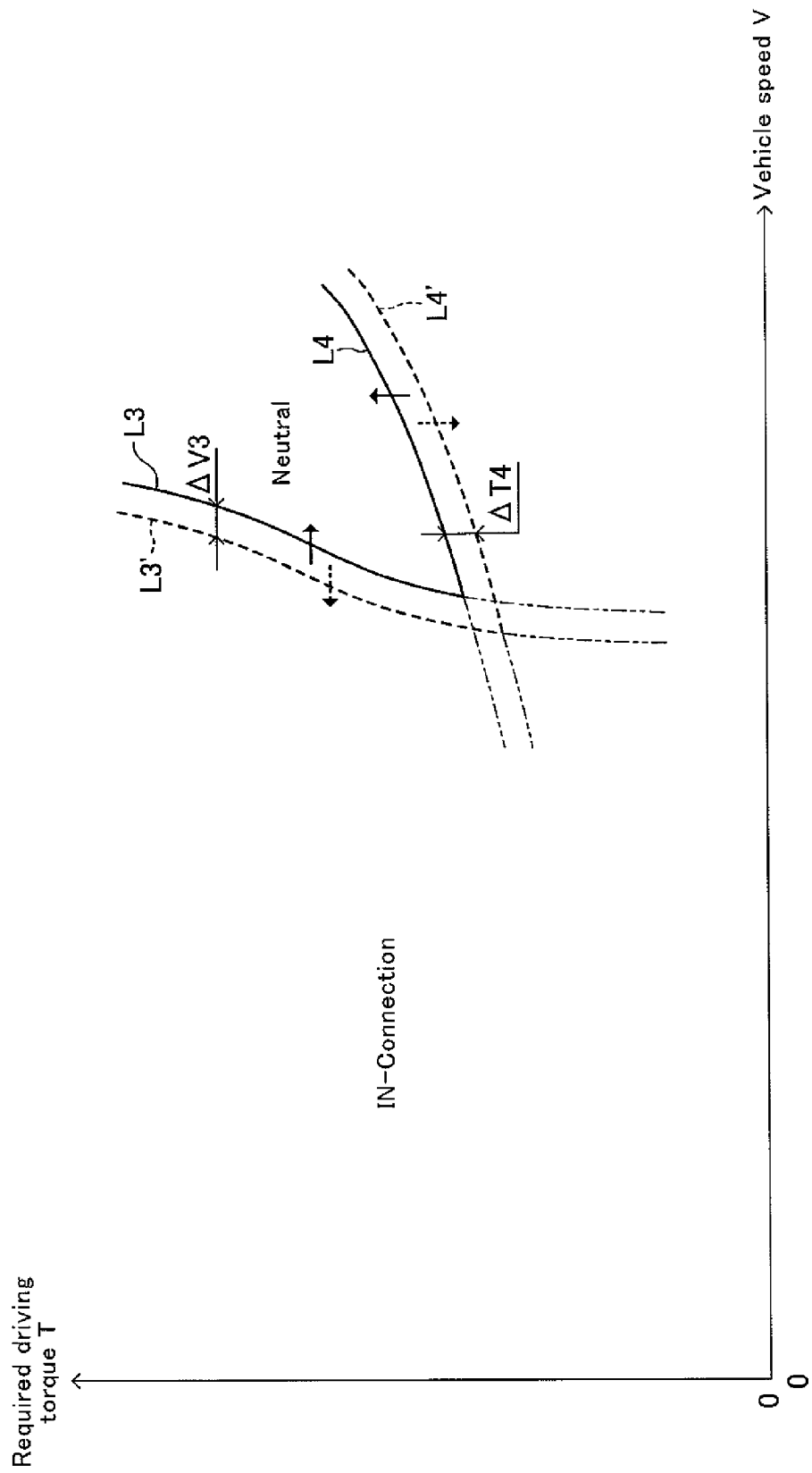
FIG. 10 is a graph showing a relation among a vehicle speed and a required driving torque as well as a connection state selected by the changeover mechanism, when the lubricating oil temperature is lower than a predetermined value, in a modification of the embodiment shown in FIG. 1.

Further, in the embodiment described above, when the T/M oil temperature is lower than or equal to a first predetermined value (for example, the value Tb shown in FIG. 9), the boundary lines L1, L1', L2 and L2' shown in FIG. 8 are omitted so that the OUT-Connection area is disappears, and the first and second IN-Connection areas are united/merged into a single IN-Connection area, as shown in FIG. 10. This allows a period in which the OUT-Connection area is selected to be changed into a period in which the IN-Connection area is selected, and the period in which the IN-Connection area is selected thereby lengthens. As a result, the T/M oil temperature can be effectively increased.

Figure 11:
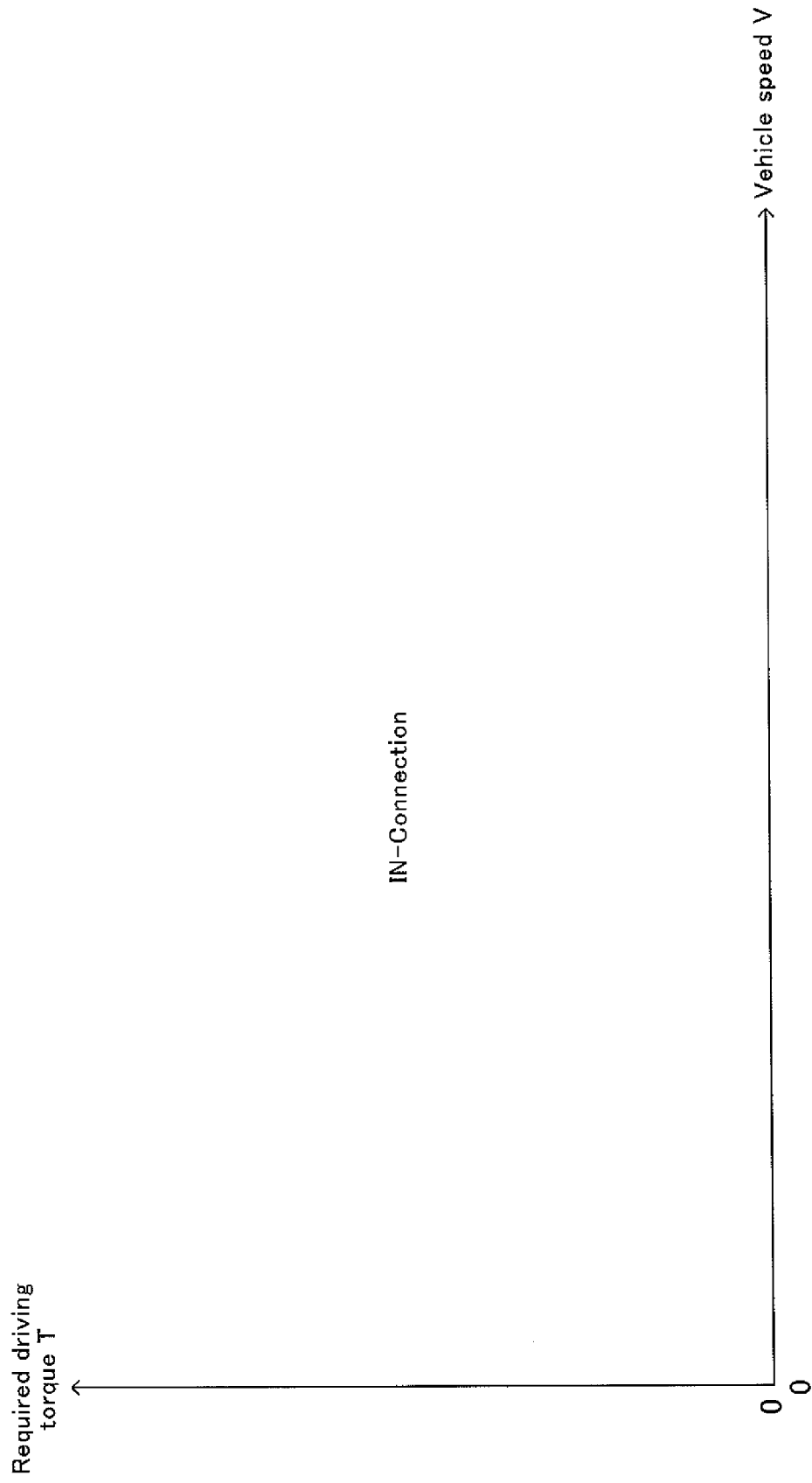
FIG. 11 is a graph showing a relation among a vehicle speed and a required driving torque as well as a connection state selected by the changeover mechanism, when the lubricating oil temperature is lower than a predetermined value, in another modification of the embodiment shown in FIG. 1.

Similarly, in the embodiment described above, when the T/M oil temperature is lower than or equal to a second predetermined value (for example, a value equal to the Tb or a value smaller than the Tb shown in FIG. 9), the present apparatus may be configured in such a manner that only the IN-Connection area is selected without depending on the vehicle speed V and the required driving torque T, as shown in FIG. 11. This can also increase the T/M oil temperature effectively.

Furthermore, in the embodiment described above, the positions of the boundary lines L1-L4 are changed/shifted based on the T/M oil temperature, however, the positions of the boundary lines L1-L4 may be changed/shifted based on a temperature of a cooling water to cool the E/G 10, a sum of a running distance of the vehicle after the start of the vehicle, a sum of a running time of the vehicle after the start of the vehicle, and an air temperature, etc. For example, the temperature of a cooling water to cool the E/G 10 can be obtained from an output of a cooling water temperature sensor 69.

Further, in the embodiment described above, the positions of the boundary lines L1-L4 are changed/shifted based on the T/M oil temperature, however, the positions of the boundary lines L1 and L2 only may be changed/shifted. Alternatively, only one of the positions of the boundary lines L1-L4 may be changed/shifted.

Further, in the embodiment described above, the shift amount DL* for the positions of the boundary lines L1-L4 are set in such a manner that the shift amount DL* (refer to FIG. 9) increases gradually/continuously in accordance with a decrease in the T/M oil temperature, however, the shift amount DL* may be set in such a manner that the shift amount DL* increases in a stepwise fashion (with a single step, two steps or more) in accordance with the decrease in the T/M oil temperature.

Further, the embodiment described above is configured in such a manner that it obtains the boundary lines L1-L4 from the single map (refer to FIG. 8) and it changes/shifts the positions of the obtained boundary lines L1-L4, when changing the positions of the boundary lines L1-L4 based on the T/M oil temperature. To the contrary, the embodiment described above may be configured in such a manner that it stores maps, each corresponding to FIG. 8, for different T/M oil temperature (a plurality of maps, each defining the positions of the boundary lines L1-L4, and the positions of the boundary lines L1-L4 in one of the maps is different from those in another of the maps), it selects one of the maps which corresponds to the current T/M oil temperature, and it selects the connection state of the output shaft A4 of the M/G 40 based on the boundary lines L1-L4 obtained from the selected map.

What is claimed is:

1. A vehicular power transmission control apparatus applied to a vehicle comprising an internal combustion engine and an electric motor as power sources, comprising:

a transmission including an input shaft providing a power transmission path between said transmission and an output shaft of said internal combustion engine, and an output shaft providing a power transmission path between said transmission and drive wheels of said vehicle, wherein said transmission is capable of adjusting a transmission reduction ratio which is a ratio of a rotational speed of said input shaft of said transmission to a rotational speed of said output shaft of said transmission;

a changeover mechanism which is capable of changing a connection state of an output shaft of said electric motor to any one from alternatives comprising an input-side-connection state, an output-side-connection state, and a non-connection state, or from alternatives comprising the input-side-connection state and the output-side-connection state;

said input-side-connection state being a state in which a power transmission path is provided between said output shaft of said electric motor and said input shaft of said transmission, said output-side-connection state being a state in which a power transmission path is provided between said output shaft of said electric motor and said drive wheels without involving said transmission, and said non-connection state being a state in which neither a power transmission path between said output shaft of said electric motor and said input shaft of said transmission, nor a power transmission path between said output shaft of said electric motor and said output shaft of said transmission is provided;

transmission oil temperature obtaining means for obtaining an oil-temperature-correlating-value correlating with a temperature of a lubricating oil in said transmission; and control means for selecting a target connection state of said output shaft of said electric motor from said connection states which said changeover mechanism can realize, based on said oil-temperature-correlating-value and a parameter indicative of a running condition of said vehicle other than said oil-temperature-correlating-value, wherein a time period in which said input-side-connection state is selected longer as said temperature of said lubricating oil is lower, and for controlling said changeover mechanism so that an actual connection state of said output shaft of said electric motor coincides with said selected connection state.

2. A vehicular power transmission control apparatus according to claim 1, wherein said control means is configured so as to:

change said actual connection state of said output shaft of said electric motor from said input-side-connection state to a connection state other than said input-side-connection state, when a value correlating with a speed of said vehicle as said parameter passes over a threshold while said value correlating with a speed of said vehicle is increasing; and adjust said threshold in such a manner that said threshold becomes larger as said temperature of a lubricating oil is lower.

3. A vehicular power transmission control apparatus according to claim 1, wherein said control means is configured so as to:

change said actual connection state of said output shaft of said electric motor from a connection state other than said input-side-connection state to said input-side-connection state, when a value correlating with a speed of said vehicle as said parameter passes over a threshold while said value correlating with a speed of said vehicle is increasing; and adjust said threshold in such a manner that said threshold becomes smaller as said temperature of a lubricating oil is lower.

4. A vehicular power transmission control apparatus according to claim 1, wherein said control means is configured so as to:

change said actual connection state of said output shaft of said electric motor from said input-side-connection state to a connection state other than said input-side-connection state, when a value correlating with a required driving torque as said parameter passes over a threshold while said value correlating with a required driving torque is increasing, said value correlating with a required driving torque being a value obtained based on an operation applied to an acceleration operating member by a driver of said vehicle; and adjust said threshold in such a manner that said threshold becomes larger as said temperature of a lubricating oil is lower.

5. A vehicular power transmission control apparatus according to claim 1, wherein said control means is configured so as to:

change said actual connection state of said output shaft of said electric motor from said input-side-connection state to said output-side-connection state, when a value correlating with a speed of said vehicle as said parameter passes over a first threshold while said value correlating with a speed of said vehicle is increasing;

change said actual connection state of said output shaft of said electric motor from said output-side-connection state to said input-side-connection state, when said value correlating with a speed of said vehicle passes over a second threshold larger than said first threshold while said value correlating with a speed of said vehicle is increasing;

change said actual connection state of said output shaft of said electric motor from said input-side-connection state to said non-connection state, (1) when said value correlating with a speed of said vehicle passes over a third threshold larger than said second threshold while said value correlating with a speed of said vehicle is increasing in a case where a value correlating with a required driving torque as said parameter is larger than a fourth threshold, said value correlating with a required driving torque being a value obtained based on an operation applied to an acceleration operating member by a driver of said vehicle, or (2) when said value correlating with a required driving torque passes over said fourth threshold while said value correlating with a required driving torque is increasing in a case where said value correlating with a speed of said vehicle is larger than said third threshold; and adjust said first threshold and said second threshold in such a manner that said first threshold becomes larger and said second threshold becomes smaller, as said temperature of a lubricating oil is lower.

6. A vehicular power transmission control apparatus according to claim 5, wherein said control means is configured so as to adjust at least one of said third threshold or said fourth threshold in such a manner that said third threshold becomes larger as said temperature of a lubricating oil is lower and said fourth threshold becomes larger as said temperature of a lubricating oil is lower.

7. A vehicular power transmission control apparatus according to claim 5, wherein said control means is configured so as to fix said actual connection state of said output shaft of said electric motor to said input-side-connection state in a case where said value correlating with a speed of said vehicle is smaller than or equal to said third threshold, when said temperature of a lubricating oil is lower than a first predetermined value.

8. A vehicular power transmission control apparatus according to claim 5, wherein said control means is configured so as to fix said actual connection state of said output shaft of said electric motor to said input-side-connection state irrespective of said value correlating with a speed of said vehicle and said value correlating with a required driving torque, when said temperature of a lubricating oil is lower than a second predetermined value.

9. A vehicular power transmission control apparatus according to claim 1, comprising a clutch mechanism, disposed between said output shaft of said internal combustion engine and said input shaft of said transmission, for shutting and providing a power transmission path between said output shaft of said internal combustion engine and said input shaft of said transmission, and wherein, said transmission is a multiple gear ratio transmission which does not comprise a torque converter and which can realize each of a plurality of predetermined reduction ratios different from one another as said transmission reduction ratio, and said control means is configured so as to control shutting and providing of said power transmission path by said clutch mechanism, and so as to control said transmission reduction ratio based on a driving condition of said vehicle.

* * * * *